(12) United States Patent
Hsu et al.

(10) Patent No.: US 7,003,188 B2
(45) Date of Patent: Feb. 21, 2006

(54) LOW LOSS OPTICAL SWITCHING SYSTEM

(76) Inventors: Ying Wen Hsu, 6455 Frampton Cir., Huntington Beach, CA (US) 92648; Arthur R. Telkamp, 3691 Fenn St., Irvine, CA (US) 92614

( * ) Notice: Subject to any disclaimer, the term of this patent is extended or adjusted under 35 U.S.C. 154(b) by 30 days.

(21) Appl. No.: 10/676,628

(22) Filed: Sep. 30, 2003

(65) Prior Publication Data

US 2004/0071395 A1    Apr. 15, 2004

Related U.S. Application Data

(63) Continuation of application No. 10/052,829, filed on Oct. 19, 2001, now Pat. No. 6,647,168, which is a continuation of application No. 09/837,829, filed on Apr. 17, 2001, now Pat. No. 6,690,847, and a continuation-in-part of application No. 09/837,817, filed on Apr. 17, 2001, now Pat. No. 6,647,170.

(51) Int. Cl.
*G02B 6/26* (2006.01)
*G02B 6/42* (2006.01)

(52) U.S. Cl. ............ 385/16; 385/17; 385/20; 385/24; 385/25; 385/40; 359/618

(58) Field of Classification Search .......... 385/140, 385/14–25, 31–33, 34, 39–52, 57, 97; 398/43, 398/45, 55–57; 359/618
See application file for complete search history.

(56) References Cited

U.S. PATENT DOCUMENTS

| | | | |
|---|---|---|---|
| 4,693,547 A | 9/1987 | Soref et al. ............. 350/96.13 |
| 5,039,191 A | 8/1991 | Myszka | |
| 5,095,519 A * | 3/1992 | Dorsey ..................... 385/140 |
| 5,235,672 A | 8/1993 | Carson ..................... 395/24 |
| 5,245,458 A | 9/1993 | Taylor ..................... 359/108 |
| 5,278,692 A * | 1/1994 | Delapierre .............. 359/236 |
| 5,357,590 A | 10/1994 | Auracher ................ 385/33 |
| 5,596,662 A | 1/1997 | Boscher | |
| 5,612,815 A * | 3/1997 | Labeye et al. ........... 359/320 |

(Continued)

FOREIGN PATENT DOCUMENTS

DE    3817035 C1    8/1989

(Continued)

OTHER PUBLICATIONS

Benaissa, K.; and Nathan, A.; "Silicon Anti-Resonant Reflecting Optical Waveguides for Sensor Applications;" *Journal of Sensors and Actuators* (A Physical), A65, 33–44, 1998.

(Continued)

*Primary Examiner*—Frank G. Font
*Assistant Examiner*—Ryan Lepisto

(57) ABSTRACT

An optical switching system that switches the path of an optical signal by moving a microstructure onto which a light-guiding structure is mounted. The microstructure is formed by a MEMs and semiconductor process to be integral to the substrate. The light-guiding structure may include waveguides. The microstructure moves from one position to another position (e.g., laterally, vertically, rotationally) such that incoming optical signals align over a small air gap to different optical paths, depending on the position of the movable microstructure. As a result, the optical signal propagate along different optical paths (e.g., straight pass through or cross over) depending on the position of the movable microstructure. The optical paths have a large radii of curvature so as to change the direction of the optical signal gradually, thereby reducing insertion losses. By combining optical switches in both the vertical and horizontal directions, the resulting optical switching system handles switching in three dimensions.

5 Claims, 14 Drawing Sheets

U.S. PATENT DOCUMENTS

| | | | |
|---|---|---|---|
| 5,623,564 | A | 4/1997 | Presby |
| 5,671,304 | A * | 9/1997 | Duguay ........................ 385/17 |
| 5,727,099 | A * | 3/1998 | Harman ........................ 385/52 |
| 5,757,986 | A | 5/1998 | Crampton et al. .............. 385/2 |
| 5,761,350 | A | 6/1998 | Koh ............................ 385/14 |
| 5,828,800 | A | 10/1998 | Henry et al. ................... 385/20 |
| 5,848,206 | A | 12/1998 | Labeye et al. |
| 5,864,643 | A * | 1/1999 | Pan ............................. 385/22 |
| 5,920,665 | A * | 7/1999 | Presby ........................ 385/16 |
| 5,923,798 | A | 7/1999 | Aksyuk et al. ............... 385/19 |
| 5,926,594 | A | 7/1999 | Song et al. |
| 5,970,192 | A | 10/1999 | Osugi et al. |
| 5,990,473 | A | 11/1999 | Dickey et al. ......... 250/231.13 |
| 6,072,924 | A | 6/2000 | Sato et al. .................... 385/18 |
| 6,101,299 | A | 8/2000 | Laor |
| 6,102,582 | A * | 8/2000 | Espindola et al. ............ 385/57 |
| 6,122,423 | A | 9/2000 | You et al. |
| 6,137,941 | A * | 10/2000 | Robinson .................... 385/140 |
| 6,148,124 | A | 11/2000 | Aksyuk et al. ............... 385/24 |
| 6,169,826 | B1 * | 1/2001 | Nishiyama et al. ........... 385/22 |
| 6,175,675 | B1 | 1/2001 | Lee et al. |
| 6,205,267 | B1 | 3/2001 | Aksyuk et al. ............... 385/19 |
| 6,219,472 | B1 * | 4/2001 | Horino et al. ................ 385/16 |
| 6,253,011 | B1 | 6/2001 | Haake et al. |
| 6,275,326 | B1 | 8/2001 | Bhlia et al. |
| 6,295,154 | B1 * | 9/2001 | Laor et al. ................... 359/223 |
| 6,388,798 | B1 * | 5/2002 | Smith et al. ................ 359/290 |
| 6,411,765 | B1 | 6/2002 | Ono |
| 6,526,198 | B1 | 2/2003 | Wu et al. |
| 6,647,168 | B1 * | 11/2003 | Hsu et al. ...................... 385/16 |
| 6,647,170 | B1 * | 11/2003 | Hsu ............................. 385/17 |
| 6,654,523 | B1 | 11/2003 | Cole |
| 6,690,847 | B1 * | 2/2004 | Hsu ............................. 385/16 |
| 6,694,071 | B1 * | 2/2004 | Hsu ............................. 385/16 |
| 2002/0054748 | A1 * | 5/2002 | Hsu ............................. 385/140 |
| 2002/0094151 | A1 | 7/2002 | Li |

FOREIGN PATENT DOCUMENTS

| | | |
|---|---|---|
| EP | 0 545 584 | 11/1992 |
| EP | 1004910 A2 | 5/2000 |
| FR | 00 15751 A1 | 6/2002 |
| JP | 58068702 | 4/1983 |
| JP | 63063006 | 3/1988 |
| JP | 04177225 | 6/1992 |
| JP | 06109990 | 4/1994 |
| JP | 10123373 | 5/1998 |
| JP | 10-227986 | 8/1998 |
| WO | WO 01/77742 A2 | 10/2001 |

OTHER PUBLICATIONS

Broekemoto, Takuji; Noguchi, Yutaka; et al., "Polyimide Optical Waveguides With Multi-Fan-Out for Multi-Chip Module Application;" *Proceedings of the 27th European Solid-State Device Research Conference, France*, Sep. 22-24, 1997.

Brown, K.S.; Taylor, B.J.; Dawson; J.M.; Hornak, L.A.; "Polymer Waveguide Co-integration With Microelectromechanical Systems (MEMS) for Integrated Optical Metrology;" *Proceedings of the SPIE (The International Society for Optical Engineering)*, vol. 3276, 1998.

Burcham, Kevin E.; and Boyd, Joseph T.; "Freestanding, Micromachined, Multimode Silicon Optical Waveguides at $\lambda$= 1.3 $\mu$m for Microelectromechanical System Technology;" *Journal of Applied Optics*, vol. 37, No. 36, Dec. 20, 1998.

Churenkov, A.V.; "Silicon Micromechanical Optical Waveguide for Sensing and Modulation;" *Journal of Sensors and Actuators* (A Physical), vol. A57, No. 1, Oct. 1996.

Cook, J.P.D.; Este, G.O.; Shepherd, F.R.; et al.; "Stable, Low-Loss Optical Waveguides and Micromirrors Fabricated in Acrylate Polymers" *Applied Optics Journal*, vol. 37, No. 7, Mar. 1, 1998.

Cornett, Kimberly T.; Heritage, Jonathan P.; Solgaard, Olav; "Compact Optical Delay Line Based on Scanning Surface Micromachined Polysilicon Mirrors;" *2000 IEEE/LEOS International Conference on Optical MEMS*, Kauai, Hawaii, Aug. 21-24, 2000.

de Labachelerie, M.; Kaou, N.; et al.; "A Micromachined Connector for the Coupling of Optical Waveguides and Ribbon Optical Fibers;" *Journal of Sensors and Actuators (A Physical)*, vol. A89, No. 1-2, Mar. 20, 2001.

Eng, Terry T.H.; Kan, Sidney C.; and Wong, George K.L.; "Voltage-Controlled Micromechanical SOI Optical Waveguides;" IEEE TENCON, IEEE Region 10 International Conference on Microelectronics and VLSL—" Asia Pacific Microelectronics 2000"—Proceedings, 1995, Dec. 9, 2002.

Eng, Terry T.H.; Kan, Sidney C.; and Wong, George K.L.; "Surface-Micromachined Epitaxial Silicon Cantilevers as Movable Optical Waveguides on Silicon-on-Insulator Substrates;" *Journal on Sensors and Actuators A, Physical*, vol. A49, No. 1-2, Jun. 1995.

Eng, Terry T.H.; Kan, Sidney C.; and Wong, George K.L.; "Surface-Micromachined Movable SOI Optical Waveguides;" *Proceedings of the International Solid-State Sensors and Actuators Conference—Transducer*, 1995.

Gorecki, Christopher; "Optimization of Plasma-Deposited Silicon Oxinitride Films for Optical Channel Waveguides;" *Journal of Optics and Laser Engineering*, vol. 33, No. 1, Jan. 2000.

Haronian, D.; "Bottlenecks of Opto-MEMS;" *SPIE Proceedings—Micro-Opto-Electro-Mechanical Systems*, Glasgow, UK, May 22-23, 2000.

Haronian, D.; "Displacement Sensing Using Geometrical Modulation in Reflection Mode (GM-RM) of Coupled Optical Waveguides;" *Journal of Micromechanics and Microengineering*, vol. 8, No. 4, Dec. 1998.

Haronian, D.; "Suspended Optical Waveguide With In-Plane Degree of Freedom or Microelectro-Mechanical Applications;" *Electronics Letters*, vol. 34, No. 7, 2nd Apr. 1998.

Hoffmann, Martin; Kopka, Peter; and Voges, Edgar; "Thermooptical Digital Switch Arrays in Silica-on-Silicon With Defined Zero-Voltage State;" *Journal of Lightwave Technology*, vol. 16, No. 3, Mar. 1998.

Jin, Young-Hyun; Seo, Kyoung-Sun; et al.; "An SOI Optical Microswitch Integrated With Silicon Waveguides and Touch-down Micromirror Actuators;" *2000 IEEE/LEOS International Conference on Optical MEMS*, Aug. 21-24, 2000.

Koyanagi, Mitsumasa; "Optical Interconnection Using Polyimide Waveguide for Multi-Chip Module;" *Proceedings of SPIE, Society of Photo-Optical Instrumentation Engineers*, San Jose, CA, 1996.

Kruger, Michiel V.P.; Guddal, Michael H.; et al.; "Low Power Wireless Readout of Autonomous Sensor Wafer Using MEMS Grating Light Modulator;" *2000 IEEE/LEOS International Conference on Optical MEMS*, Kauai, Hawaii, Aug. 21-24, 2000.

Kuwana, Yasuhiro; Hirose, Akinori; Kurino, Hiroyuki; et al.; "Signal Propagation Characteristics in Polyimide Optical Wave-guide With Micro-Mirrors for Optical Multichip Module;" *Japanese Journal of Applied Physics*, vol. 38, No. 4B, Apr. 1999.

Makihara, M.; "Microelectromechanical Intersecting Waveguide Optical Switch Based on Thermo-Capillarity;" *2000 IEEE/LEOS International Conference on Optical MEMS, Kauai, Hawaii, Aug. 21-24, 2000*.

Makihara, M.; Sato, Makoto; Shimokawa, Fusao; et al.; "Micromechanical Optical Switches Based on Thermocapillary Integrated in Waveguide Substrate;" *Journal of Lightwave Technology, vol. 17, No. 1, Jan. 1999*.

Makihara, M.; Shimokawa, F.; and Nishida, Y.; "Self-Holding Optical Waveguide Switch Controlled by Micromechanism;" *IEICE Trans. Electronics (Japan), vol. E80-C, No. 2, Feb. 1997*.

Maoisel, J.; Guttmann, J.; Huber, H.P.; et al.; "Optical Backplanes With Integrated Polymer Waveguides;" *Journal of Optical Engineering, vol. 39, No. 3, Mar. 2000*.

Marou, Shoji; Ikuta, Koji; and Ninagawa, Toshihide; "Multi-Polymer Microstereolithography for Hybride Opto-MEMS" has the same information as "Advanced Micro Sterelithography with Multi UV Polymers (System Development and Application to Three-Dimensinal Optical Waveguides)," which is written in Japanese; *Journal of Transactions of the Institute of Electrical Engineers of Japan*, Part E, vol. 120-E, No. 7, Jul. 2000.

Matsumoto, Takuji; Kuwana, Yasuhiro; Hirose, Akinori; "Polyimide Optical Waveguide With Multi-Fan-Out for Multichip Module System;" *Proceedings from the Optoelectronic Interconnects V, vol. 3288, San Jose, CA Jan. 28-29, 1998*.

Matsumoto, Takuji; Fukuoka, Takeshi; Kurino, Hiroyuki; et al.; "Polyimide Optical Waveguide With Multi-Fan-Out for Multi-Chip Module Application;" *Proceedings of the 27th European Solid-State Device Research Conference, France, Sep. 22-24, 1997*.

Maoisel, Jorg; Guttmann; Joachim; Huber, Hans-Peter; "Optical Backplanes With Integrated Polymer Waveguides," *Journal of Optical Engineering*, vol. 39, No. 3, Mar. 2000.

Mueller, Raluca; Pavelescu; and Manea, Elena; "3D Microstructures Integrated With Optical Waveguides and Photodiodes on Silicon," MELECOB 1998 9th Mediterranean Electromechanical Conference Proceedings, vol. 1; May 18-20, 1998.

Namba, Tohru; Uehara, Akihito; et al.; "High-Efficiency Micromirrors and Branched Optical Waveguides on Si Chips;" *Japanese Journal of Applied Physics, Part 1, vol. 35, No. 2B, Aug. 21-24, 1995*.

Oillier, Eric; Chabrol, Claude; et al.; "1 × 8 Mirco-Mechanical Switches Based on Moving Waveguides for Optical Fiber Network Switching;" *IEEE/LEOS International Conference on Optical MEMS, Aug. 21-24, 2000*.

Oillier, Eric; and Mottier, P.; "Micro-Opto-Electro-Mechanical Systems: Recent Developments and LEIT's Activities," *Proceedings fo the SPIE—The International Society for Optical Engineering, vol. 4076, May 22-24, 2000*.

Shubin, I.; and Wa, P.L.K.; "Electrostatically Actuated 1× 2 Micro-Mechanical Optic Switch;" *Electronics Letters, vol. 37, No. 7; Mar. 29, 2001*.

Storgaard-Larsen, Torben; "Plasma-Enhanced Chemical Vapor Deposited Silicon Oxynitride Films for Optical Waveguide Bridges for Use in Mechanical Sensors;" *Journal of the Electromechanical Society, vol. 144, No. 4, Apr. 1997*.

Voges, E.; Hoffmann, M.; "FB1 Optical Waveguides on Silicon Combined With Micromechanical Structures;" *Advanced Applications of Lasers in Materials and Processing; LEOS Summer Optical Meeting, 1996; IEEE, Piscataway, Jew Jersey, 96TH8154*.

Yokoyama, S.; Nagata, T.; and Kuroda, Y.; et al.; "Optical Waveguides on Silicon Chips;" *Journal of Vacuum Science & Technology A, vol. 13, No. 3, May-Jun. 1995*.

Bahadori, et al., Automated Fiber-Waveguide Array AlignmentJournal of Optical Communications, Fachverlag Schiele & Schon, Berlin, Germany, vol. 10, No. 2, Jun. 1, 1989, pp. 54-55.

* cited by examiner

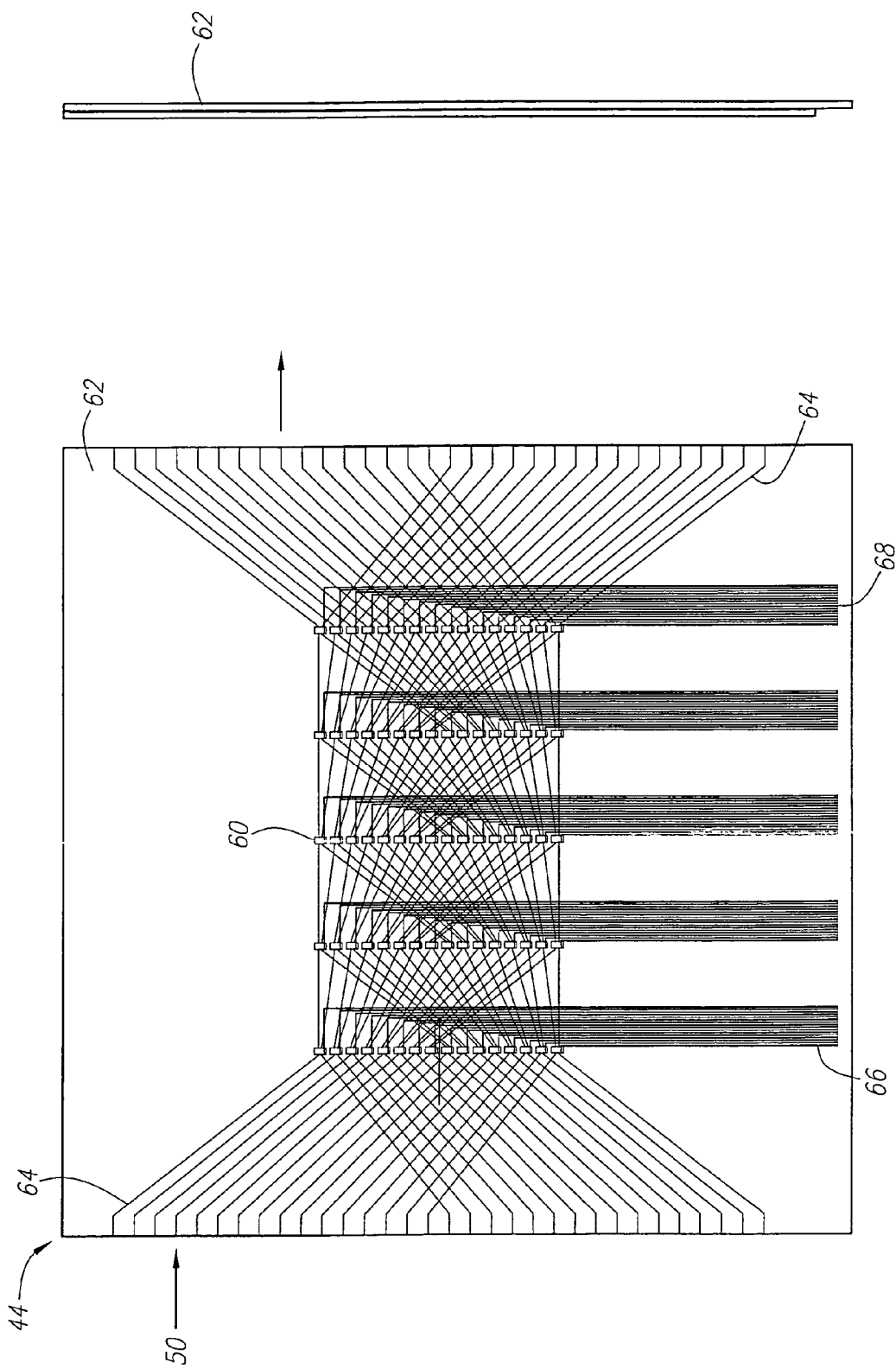

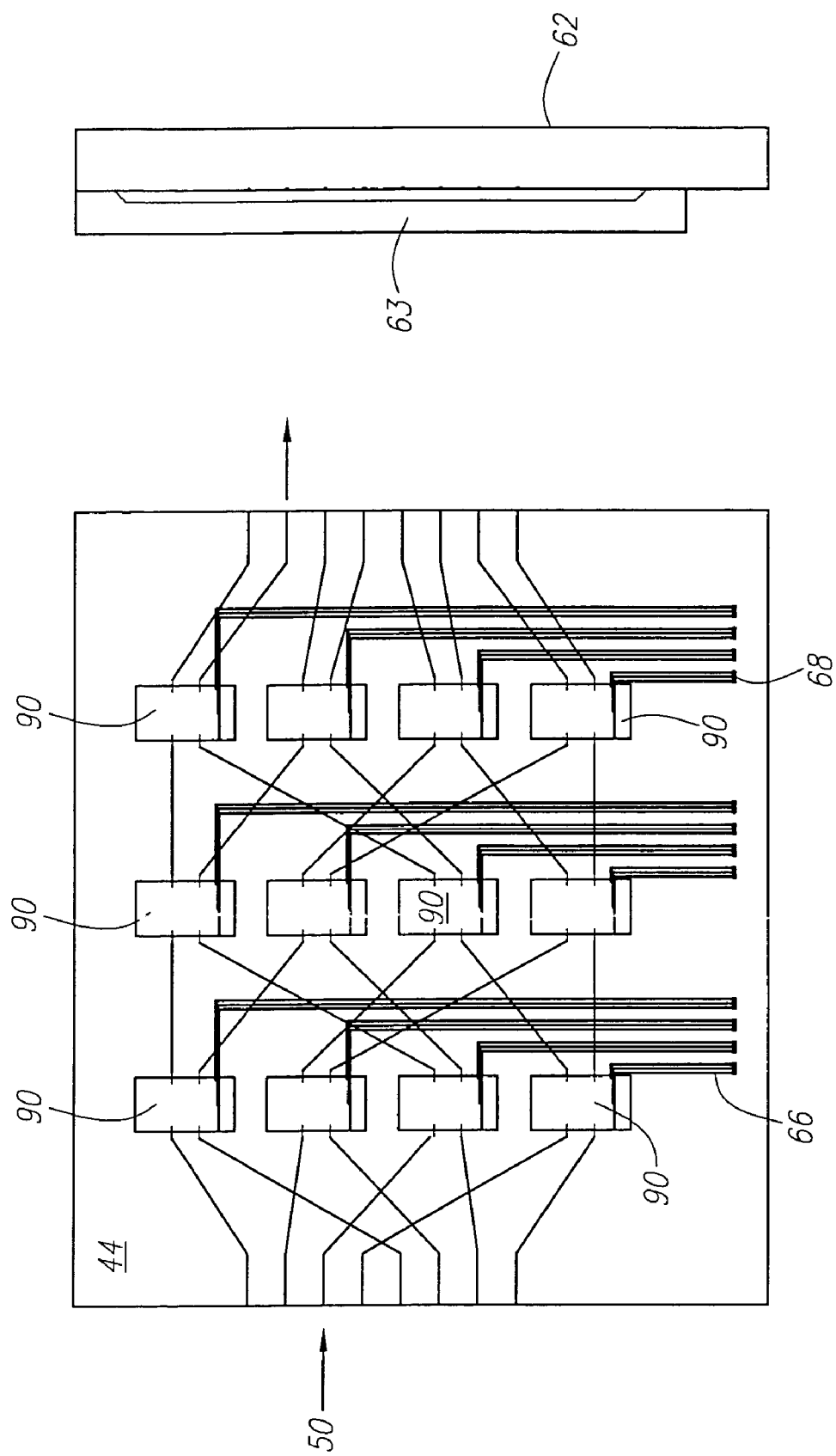

LOW LOSS OPTICAL SWITCHING SYSTEM

CROSS-REFERENCE TO RELATED APPLICATIONS

This patent application is a continuation of U.S. patent application Ser. No. 10/052,829, filed on Oct. 19, 2001, now U.S. Pat. No. 6,647,168, which is a continuation-in-part of U.S. patent application Ser. No. 09/837,829, filed on Apr. 17, 2001, and U.S. patent application Ser. No. 09/837,817, filed on Apr. 17, 2001, the disclosures of which are incorporated herein by reference. This application also claims priority to provisional U.S. patent application Ser. No. 60/233,672, filed on Sep. 19, 2000, and provisional U.S. patent application Ser. No. 60/241,762, filed on Oct. 20, 2000, the disclosures of which are incorporated herein by reference. This patent application is also related to U.S. patent application Ser. No. 09/046,416, filed on Oct. 19, 2001, the disclosure of which is incorporated herein by reference.

FIELD OF THE INVENTION

The field of the invention relates generally to a device and method for switching an optical signal with lower bending losses and in particular, to a device and method for switching an optical signal by gradually changing the direction of the optical signal.

BACKGROUND OF THE INVENTION

The interest in optical switching devices has been driven by the tremendous increase in demand for more usage and faster communications systems, i.e. greater bandwidth, in the telecommunication industry. The prime examples of applications that are pushing this demand are the Internet, video/music on demand, and corporate data storage. The existing telecommunication infrastructure, which was largely developed for telephone calls, is now incapable of meeting the demands for new applications of data communication.

Several options have been developed to meet this new demand. These options include wireless, optical, and free-space laser communication technologies. To date, the most promising technology capable of meeting the projected bandwidth requirements of the future is the optical technology.

In an all optical network, or in a combination of an optical and electrical network, the necessary components include a signal carrier medium (i.e. optical fiber), signal routing systems, and data control systems. These signal routing systems have devices which switch optical signals between optical fibers.

In the prior art approaches, the switching of optical signals can be accomplished in predominantly two major approaches: electrical and optical. Today, most systems use electrical switching. In these systems, at the network junctions, the optical signals must first be converted into electrical signals. The converted electrical signals are then switched to the designated channel by integrated circuits. Lastly, the electrical signals must be converted back into optical signals before the signals can be passed onto the optical fiber toward the next destination. Such optical converters are relatively expensive compared to the rest of the transmission equipment.

Electrical switching technology is reliable, inexpensive (except for optical converters), and permits signal reconditioning and monitoring. The main drawback with electrical switching systems is that the number of junctions in a long distance network can be large, and the total cost of converters is very high. Furthermore, typically more than 70% of signals arriving at a junction require only simple straight pass-through, and conversion (down and up conversions) of the full signal results in inefficient use of hardware. System designers also anticipate that future systems are best served by transparent optical switch capabilities; that is, switching systems capable of redirecting the path of the optical signal without regard to the bit rate, data format, or wavelength of the optical signal between the input and output ports. Most electrical switching systems are designed for a specific rate and format, and cannot accommodate multiple and dynamic rates and formats. Future systems will also be required to handle optical signals of different wavelengths, which in an electrical switching network would necessitate the use of separate channels for each wavelength. These limitations of the electrical switching system provide new opportunities for the development of improved optical switching systems.

A switch that directly affects the direction of light path is often referred to as an Optical Cross Connect (OXC). Conventional optical fabrication techniques using glass and other optical substrates cannot generate products that meet the performance and cost requirements for data communication applications. Unlike the electrical switching technique that is based on matured integrated circuit technology, optical switching (ones that can achieve high port count) depends on technologies that are relatively new. The use of micromachining is one such new approach. The term MEMS (Micro Electro-Mechanical Systems) is used to describe devices made using wafer fabrication process by micromachining (mostly on silicon wafers). The batch processing capabilities of MEMS enable the production of these devices at low cost and in large volume.

MEMS-based optical switches can be largely grouped into three categories: 1) silicon mirrors, 2) fluid switches, and 3) thermal-optical switches. Both fluid and thermal-optical switches have been demonstrated, but these technologies lack the ability to scale up to a high number of channels or port counts. A high port count is important to switch a large number of fibers efficiently at the junctions. Thus far, the use of silicon mirrors in a three dimensional (3D) space is the only approach where a high port count (e.g., greater than 1000) is achievable.

Optical Cross Connects that use 3D silicon mirrors face extreme challenges. These systems require very tight angular control of the beam path and a large free space distance between reflective mirrors in order to create a device with high port counts. The precise angular controls required are typically not achievable without an active control of beam paths. Since each path has to be monitored and steered, the resulting system can be complex and costly. These systems also require substantial software and electrical (processing) power to monitor and control the position of each mirror. Since the mirror can be moved in two directions through an infinite number of possible positions (i.e., analog motion), the resulting feedback acquisition and control system can be very complex, particularly for a switch having large port counts. For example, as described in a recent development report, Lucent Technology's relatively small 3D mirror-switching prototype was accompanied by support equipment that occupied three full-size cabinets of control electronics.

Ideally, an optical switch will have at least some of the following principal characteristics:
1) Be scalable to accommodate large port counts (>1000 ports);
2) Be reliable;

3) Be built at a low cost;
4) Have a low switching time;
5) Have a low insertion loss/cross talk.

While the 3D-silicon mirror can meet the scalability requirement, it cannot achieve the rest of the objectives. Therefore, prior pending patent applications, U.S. patent application Ser. Nos. 09/837,829 and 60/233,672, presented a new approach whereby the complex nature of the 3D free space optical paths and analog control can be replaced with guided optical paths and digital (two states) switching. Such a system greatly simplifies the operation of switching, enhance reliability and performance, while significantly lowering cost. However, there is a need to further improve devices used for switching optical signals because in optical switches, one of the key figures of merit is the Insertion Loss, a parameter that measures the amount of light lost as a result of optical signal traversing through the switch.

The insertion loss consists of a number of components, including loss due to coupling between fiber and switch element, loss due to absorption of light in the waveguide material, and loss due to light traversing in a curved path or around corners. For example, if a waveguide has high-angle bends, there are greater losses in the optical signal passing through the bends. In particular, there is a need to reduce the bending losses in an optical switch element while minimizing the element size. Ideally, the improvement would minimize individual losses and balance the losses between different mechanisms to yield the lowest total insertion loss. In addition to the insertion loss and small element size, other requirements such as power, switching time, and polarization effects are also important considerations in the design.

FIG. 9 is adapted from related and copending U.S. patent application Ser. Nos. 09/837,829 and 60/233,672 and illustrates a concept for using movable microstructure to switching optical signals. In FIG. 9, waveguides 501 are used to conduct optical signals from input 502 to output connections 503. For additional detail, please refer to U.S. patent application Ser. No. 09/837,829. To enable light paths to crossover, waveguide designs with approximately 90-degree bends 504 are shown in FIG. 9. Although a 90-degree bend is possible, such design must be done under numerous constraints; in particular, bend radius. For example, the optical loss due to a waveguide with a bend radius R can be estimated as:

Bend Loss =
$$10\log \exp\left[-(R\Theta)\frac{1}{kn_{\mathit{eff}}a^2}\frac{U^2W^2e^{2W}}{1+W}\exp\left(-\frac{4}{3}\frac{W^3\Delta R}{V^2 a}\right)\right] \text{ (in dB)},$$

where $\Delta=(n_1^2-n_2^2)/(2n_1^2)$ is a measure of the difference between the refractive index of the core of the waveguide ($n_1$) and material that surrounds the core ($n_2$). From the equation above, it can be shown that when a small radius is required, it is possible to compensate for loss by using large $\Delta$s. Materials with a wide range of refractive indexes have been used successfully in waveguides including silica, silicon, polymer and various other materials.

FIG. 10 illustrates a typical waveguide design where different components of the waveguide are identified. The same material, such as silica, is used for the core 505 as well as for the buffer 506 and cladding 507, but the core is doped with another material to increase its index of refraction. The buffer 506 may be adjacent to a silicon substrate. Using a cladding 507 is not always required since air has an index of refraction (n=1.00) that is lower than any solid material and can be used to guide light effectively.

A main problem with employing large $\Delta$s is that the size of the waveguide must be substantially reduced to maintain single mode propagation, which is an important criterion for telecommunication applications. The relationship between waveguide core width for a square waveguide and $\Delta$ for single mode propagation is illustrated by the following equation:

$$d = \frac{4.272}{kn_1\sqrt{2\Delta}}$$

As can be seen in above equation, the larger the $\Delta$, the smaller the core size d required. The problem with using small waveguides is that it increases the optical loss due to fiber coupling with a large core fiber. To minimize coupling loss, a lens element is required to match the mode between the fiber and waveguide, which leads to higher manufacturing costs.

A design capable of accommodating large bend radii while maintaining a small size, is highly beneficial to controlling the overall insertion loss. A small size switch element is desirable because more elements can be produced on a single wafer. Small elements also keep the finished size small when they are used in an array connected to form a large port switch.

SUMMARY OF THE INVENTION

The invention relates generally to an optical switching device or method of switching an optical signal, which device or method uses a movable microstructure to switch the direction of the optical signal gradually so as to reduce insertion loss.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. Moreover, in the figures, like reference numerals designate corresponding parts throughout the different views. However, some corresponding parts may be given unique reference numerals.

FIG. 3A illustrates a plan view of an example embodiment of a single switching layer of FIG. 2.

FIG. 3B illustrates an edge view of an example embodiment of a single switching layer of FIG. 2.

FIG. 5A illustrates an plan view of an example embodiment of a switching layer which can switch 8×8 ports.

FIG. 5B illustrates an edge view of the switching layer of FIG. 5A.

DETAILED DESCRIPTION OF THE PREFERRED EMBODIMENTS

The first portion of this specification refers to FIGS. 1–8B and discusses an improved optical switch system. The second portion of this specification refers to FIGS. 9–15 and sets forth an improvement to the optical switch system of FIGS. 1–8B, where the improvement gradually changes the direction of an optical signal in order to reduce insertion losses.

Figure 1:
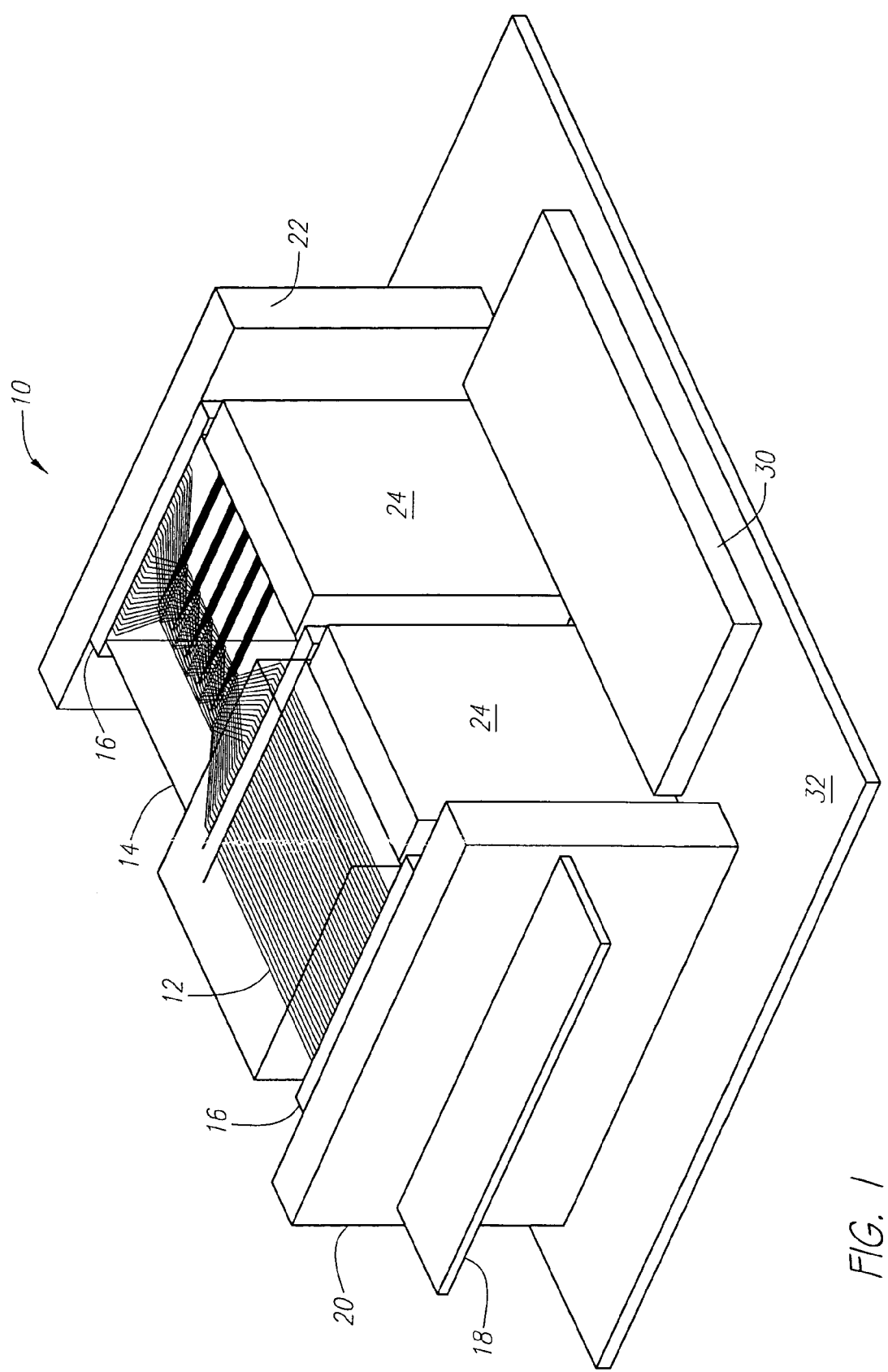
FIG. 1 illustrates a block diagram of an example embodiment of an optical switch system adapted to handle 1024 ports.

FIG. 1 illustrates a block diagram of an example embodiment of an optical switch system 10 adapted to handle 1024 ports by 1024 ports. This optical switch system 10 includes a 3-dimensional waveguide. The 3D optical switch system 10 shown in FIG. 1 employs guided wave paths (i.e., waveguide), digital switching, and is capable of handling 1024 ports. Two of the key components of the optical switch system 10 are two OXC blocks 12, 14. OXC blocks 12, 14 are also referred to as switch blocks because they include vertical and horizontal optical switches respectively. OXC block (Y) 12 is used for switching optical beams in the vertical direction, and OXC block (X) 14 switches optical beams in the horizontal direction. The two OXC blocks (Y and X) 12, 14 are connected end-to-end such that all outputs of the first (Y) OXC block 12 is connected to the input of the second (X) OXC block 14.

Since each OXC block 12, 14 is an assembled unit, some manufacturing tolerances may be inevitable. To handle the accumulation of these tolerances, an optical connector 16 is required to facilitate system assembly. Likewise, optical connectors 16 may be used at the input of the first OXC block 12, and output of the second OXC block 14, to allow for positional errors at the interface connection. Optionally, the optical connector 16 can be an optical-to-electrical-to-optical connector, a plurality of mirrors in free space, a bundle of optical fibers, or any kind of optical connector.

Optical fibers 18 are connected to the input interface 20. The switched optical signals exit at the output interface 22. For example, the input interface 20 and output interface 22 may be mechanical interfaces to fiber optics. Electrical signals for controlling individual switch elements are interconnected (between layers) in an electrical interconnect 24 on the side of each OXC block 12, 14. These electrical wires are routed to the Interface and Control Electronics 30 located adjacent to the OXC blocks 12, 14. The optical switch system 10 may be mounted on a board 32.

Figure 2:
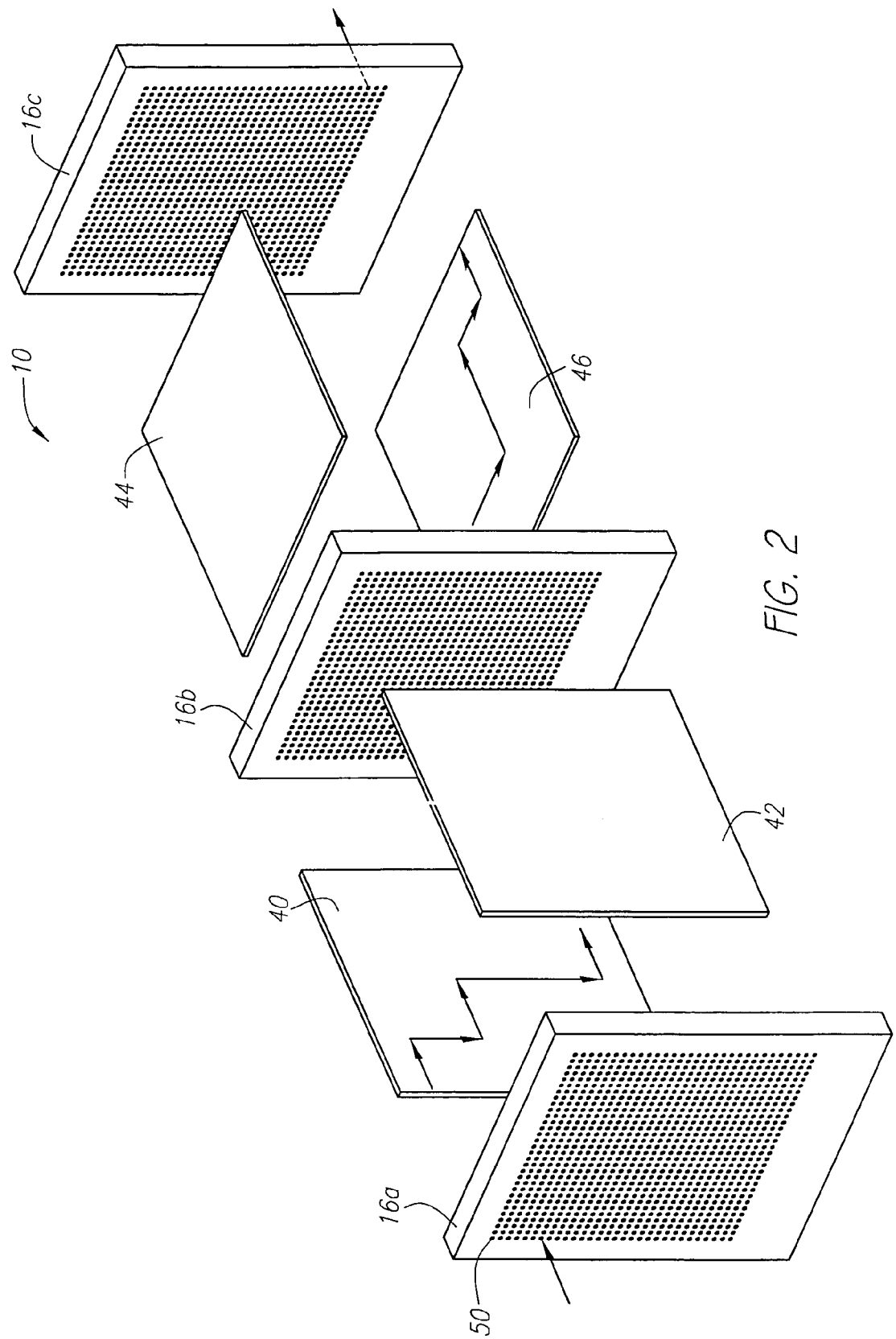
FIG. 2 illustrates an exploded conceptual view of an example embodiment of the OXC blocks and optical connectors of FIG. 1.

FIG. 2 illustrates an exploded conceptual view of an example embodiment of the OXC blocks 12, 14 and optical connectors 16A–16C of FIG. 1. For clarity, the vertical switch block, OXC block 12, is shown with only the first and last switching layers 40, 42. Each switching layer 40, 42, for example, is capable of switching 32 inputs to any of the 32 outputs in the vertical direction. By placing 32 of the switching layers together, all 32 channels can be connected along the vertical plane. To complete the full capability of switching 32×32 channels, a mechanism for switching in the horizontal direction is needed and this is fulfilled, for example, by a second OXC block 14 (the horizontal switch block). FIG. 2 shows only the first and last switching layers 44, 46 of the second (X) OXC block 14. Each switching layer 44, 46, for example, is capable of switching 32 inputs to any of the 32 outputs in the horizontal direction. By placing 32 of the switching layers together, all 32 channels can be connected along the horizontal plane. Combined into the embodiment shown in FIG. 2, the vertical and horizontal switching layers create a 32×32 optical switch.

The following example illustrates how a signal at channel (1,1) (the numbers refer to the row and column number respectively) can be routed to the channel (32,32) output. The optical beam 50 (represented in arrows) enters at the (1,1) location, through first optical connector 16A, and enters the first switching layer 40. The switches in the first switching layer 40 connect the optical beam from (1,1) to the (1,32) output. The optical signal exits the vertical (Y) switch layers, and passes and realigns properly through the second optical connector 16B into the horizontal (X) switching layer at (1, 32). The optical beam now is routed from position (1,32) to position (32,32), then realigns and exits through the third optical connector 16C.

The optical switch system 10 may have an optical path network 202, which is also referred to as a light-guiding structure. The optical path network 202 includes at least one optical path along which the optical signal 50 may travel. For example, the optical path network 202 may include a mirror, waveguide, air gap, or other structures that provide an optical path. In the example embodiment, the optical path network 202 is a waveguide network 202. One advantage of the 3D waveguide embodied in the optical switch system 10 described is that in this approach it is possible to achieve a large port count without a need to control the beam paths precisely and actively. Since the optical beam is captured within the waveguides or waveguide networks on each switching layer, only the end connections are critical. A waveguide network may include a plurality of waveguides such as waveguide network 202 shown in FIG. 8A. In fact, a waveguide network may contain only a single waveguide, if desired. Where an embodiment is described as using a waveguide network, it should be understood that the embodiment could use a waveguide instead, and vice versa. Where alignment is critical, such as at the interface, an optical connector 16 will allow for correction of beam misalignment using conventional and inexpensive optics. The simplicity of the resulting 3D waveguide and the protective environment (e.g., each switching layer can be sealed) further enhances the reliability and robustness of the system, providing beam paths which are unaffected by temperature, humidity, aging and handling.

FIGS. 3A and 3B illustrate a plan view and an edge view respectively of an example embodiment of a single switching layer of FIG. 2, for example, switching layer 44. This example shows how 32 inputs can be connected through an array of simple switch elements 60, to 32 outputs. In this example of a 32×32 port, there are 80 switch elements 60. The methodology of interconnection is well known to those skilled in the art of signal routing design and may be any methodology. Pioneering work in routing theories done at Bell Laboratories has shown that an optical signal can be efficiently routed by connecting simple switches (such as 2×2 elements) in a specific manner. By following these routing guidelines, it can be shown that every input can be connected to any output without any of the connections blocked.

The switching layer 44 shown in FIGS. 3A, 3B includes a substrate 62 that carries waveguides 64 and switch elements 60. In this example embodiment, the substrate 62 may be any semiconductor material such as silicon. In any embodiment, the substrate can be any kind of substrate. The substrate can be a composite layer made by bonding wafers together, or a monolithic layer. To protect these waveguide and switch element microstructures, the substrate 62 may be covered and sealed by using another (cap) wafer 63. An effective sealing to exclude contaminants and humidity can be achieved by bonding a cap wafer 63 to substrate 62 using any of a multitude of techniques already available, including anodic, fusion, and eutectic bonding.

Optical signals 50 enter the switching layer 44 at one edge. Preferably, the edge is polished and angled to allow a complete refraction of the optical beams 50. Depending on the optical index of the interface medium (e.g., air or another optical element), the angle of the edge can be designed to accommodate total refraction. Once the optical beam 50 enters the waveguide 64, light cannot escape from the waveguide 64 due to a phenomenon known as total internal reflection. This is the same phenomenon that allows an optical fiber to carry light for long distances without significant loss.

The switching action is controlled by the application of electrical voltage. Each switch element 60 requires, for example, three electrical connections: an actuation electrode, a position sensing electrode, and electrical ground. The electrical ground connection can be tied together to minimize the number of electrical traces. Each switch element 60 would have, therefore, a minimum of two electrical connections that need to be passed through and underneath the capping wafer 63 to interface with the outside world. In FIG. 3A, the electrical traces 66 are shown traversing substantially orthogonally to the optical path and terminating at the electrical bond pads 68 at the lower edge. Of course, the actual layout of the electrical traces 66, bond pads 68, input ports and output ports can be modified to be different than that shown in this example.

Figure 4A:
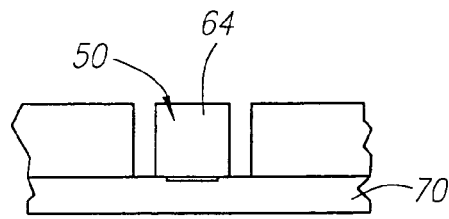
FIGS. 4A–4F illustrate different example embodiments of a waveguide on a switching layer.
Figure 4B:
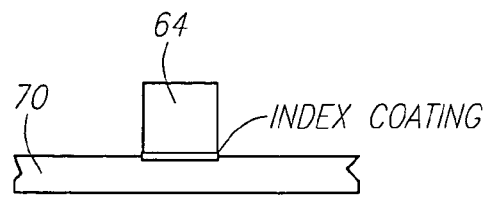

FIGS. 4A–4F illustrates various example embodiments of a waveguide 64 on a switching layer. To maintain total internal reflection (TIR), the environment surrounding the waveguide 64 must have an optical index of refraction lower than index of the waveguide 64. Glass, for example, which has an index of 1.5, can be coated with a material having a lower index, or simply use a vacuum (index 1.0) or air as the medium. A wide range of gases could be used to ensure compatibility with the wafer bonding process. In a first embodiment, FIG. 4A illustrates a cross section of a waveguide 64 formed of glass whereby the medium surrounding the waveguide 64 is in a vacuum or air. The carrier 70 may be formed of glass or silicon. In a second embodiment, FIG. 4B illustrates another waveguide 64 where the top and sides of the waveguide 64 are in contact with a vacuum while the bottom surface is bonded with an intermediate material with an index lower than that of the waveguide. The carrier 70 may be formed of glass or silicon.

In both of the FIG. 4A and 4B embodiments, the upper substrate should be a material that will transmit optical signals at the wavelength of interest, such as 0.82, 1.3, and 1.55 micrometers. These are the wavelengths that are typically used in fiber optics transmission, and in which the support equipment (such as the transmitter, carrier and receiver) is designed to handle. In both embodiments, the material on the bottom (carrier substrate 70) is used mainly to provide mechanical support to the structure. As it will be explained later, the actual switching mechanism will require some of the waveguides to move vertically or laterally by the application of an external force. The carrier substrate 70 can be made of glass, silicon, or any material compatible with micromachining.

Figure 4C:
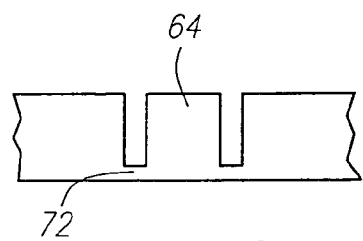
Figure 4D:
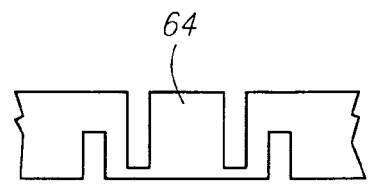

FIGS. 4C and 4D illustrate alternative embodiments of a waveguide 64 without using a substrate 70. The small amount of material 72 that bridges the waveguide 64 to adjacent material will allow some loss of light and this design needs to consider the tradeoff between mechanical strength and optical loss. One advantage of the embodiments in FIGS. 4C and 4D is that only a single-layer structure is required, avoiding the necessity of wafer bonding. Detailed designs using these alternative embodiments should involve achieving a balance between the mechanical and optical integrity of the waveguides and acceptable manufacturing costs.

Figure 4E:
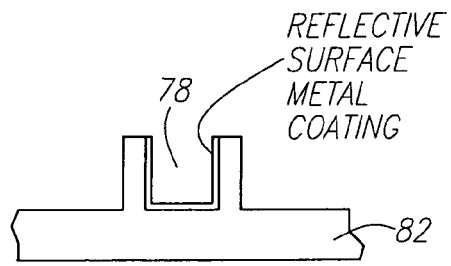

Although the preferred embodiment of an optical switch system uses a waveguide, optical guides using reflective surfaces or other known structures can also be used. FIG. 4E shows a guide 78 made by bonding two wafers 80, 82 to create a closed optical guide 78. To enhance the reflectivity of the surface, metal coating such as gold or nickel (or any other materials compatible with the micromachining process) could be deposited on the inner surfaces prior to bonding.

Figure 4F:
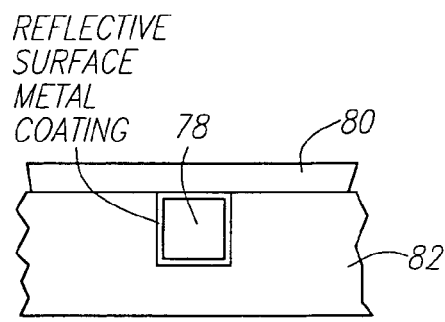

Yet another alternative embodiment is to use the vertical surfaces of the microstructure. As in a conventional optical system, such an approach would require tight angular control of the vertical walls to control the beams precisely. FIG. 4F shows a trench etched into the wafer whose vertical walls are the reflective surfaces with a top cap 80 forming a closed waveguide 78. As before, a metal coating can be applied to enhance reflectivity.

FIGS. 5A and 5B illustrate a plan view and an edge view of an example embodiment of a non-blocking switching layer 44 that performs switching of 8×8 ports. To achieve full switching capability in this example, 12 switch elements 90 are required. Each switching element 90 is capable of performing a 2×2 switch. The switching layer 44 is non-blocking because the optical signal 50 always passes to the optical output side through some optical path.

Optical connectors 16 are used to minimize insertion loss due to misalignment between the optical fiber and the switch element 90, or between OXC blocks. In both cases, there is an accumulation of geometrical tolerances due to imperfect assembly, which should be corrected to minimize loss of light. Most often, the misalignment is due to a combination of linear and angular offsets.

Figure 6B:
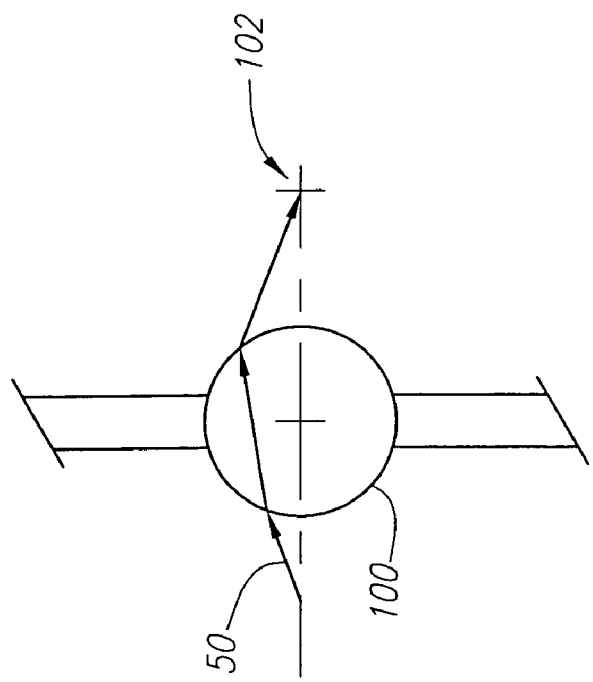
FIG. 6B illustrates how the optical connector of FIG. 6A corrects a misaligned light beam.
Figure 6A:
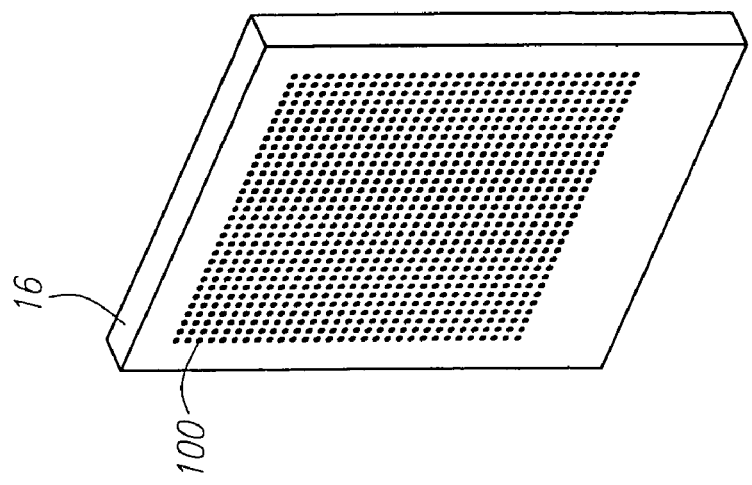
FIG. 6A illustrates an example embodiment of an optical connector whose optical substrate is machined to have an array of convex spherical surfaces.

FIG. 6A illustrates an optical connector 16 whose substrate is machined on both sides to have an array of convex spherical surfaces 100. One side of the spherical surface array is positioned to connect with a fiber bundle to receive the incoming light beam 50. The opposite convex surface focuses the beam onto a small spot to allow for connection to the OXC blocks. For example, the optical connector 16 may have as a spherical surface 100 for each port in the optical switching system (here, e.g., 32×32, or 1024 surfaces 100).

FIG. 6B illustrates how the optical connector of FIG. 6A corrects a misaligned beam of light. Let us presume a light beam 50 entering on the left that will normally be out of the range of the entrance to the OXC block or other optical passage. If uncorrected, the light beam 50 will not properly enter the entrance to the OXC block. However, the misaligned beam 50, after being corrected by a spherical surface of the optical connector 16 will emerge from the optical connector 16 focused on an image point 102. By placing the entrance pupil of the OXC block or optical fiber entrance at or near the image point 102, the emerging light beam will be approximately centered and will enter the optical passage such as a waveguide 64 at an incident angle that will be captured by a total internal reflection process. Other type of surfaces other than spherical can also be used to enhance the quality of the emerged beam. The detailed design of the optical surfaces and selection of the optical material can include those known to those skilled in the art of optical design.

The optical connector 16 which uses convex spherical surfaces 100 can be manufactured using a series of spherical balls and securing those balls in a plate with precisely machined holes. To hold the balls in place, the simplest method is to shrink the balls in a cold bath (e.g., liquid nitrogen) and inserting the balls into the holes of the plate. Proper methods of fixture will allow a large number of balls to be inserted simultaneously and precisely. Alternatively, specialized tooling with convex grinding tool bits can be made to produce the desired surfaces. The possible manufacturing techniques are numerous and include those well known to those skilled in the art of optical manufacturing.

Figure 7D:
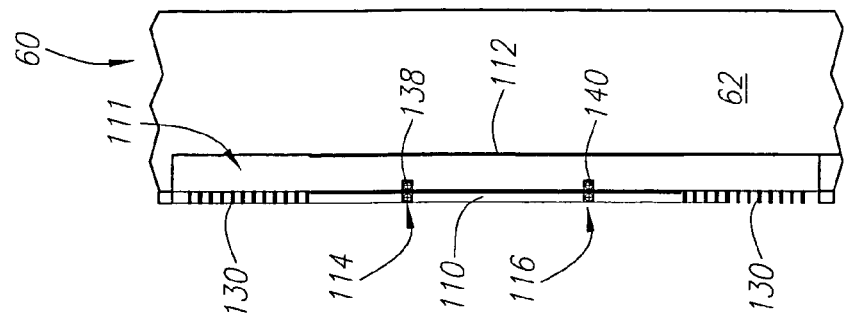
FIG. 7D illustrates an example embodiment of a switch element having a movable optically transmissive platform and a double layer of waveguides.
Figure 7C:
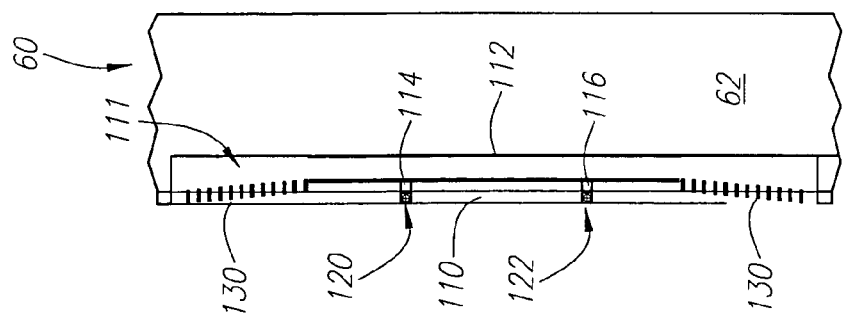
FIG. 7C illustrates the switch element of FIG. 7A when the movable platform is moved.
Figure 7B:
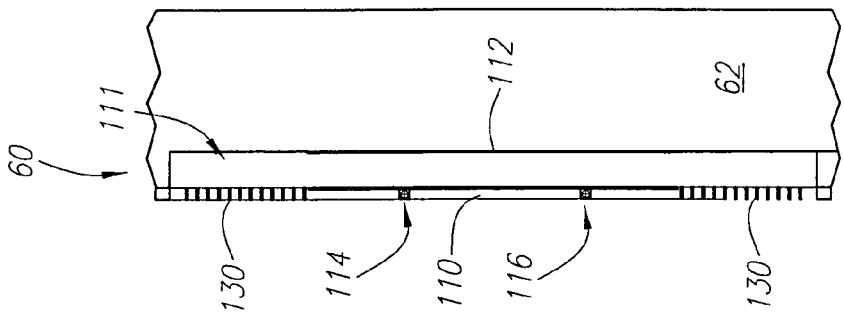
FIG. 7B illustrates the switch element of FIG. 7A when the movable platform is not moved.
Figure 7A:
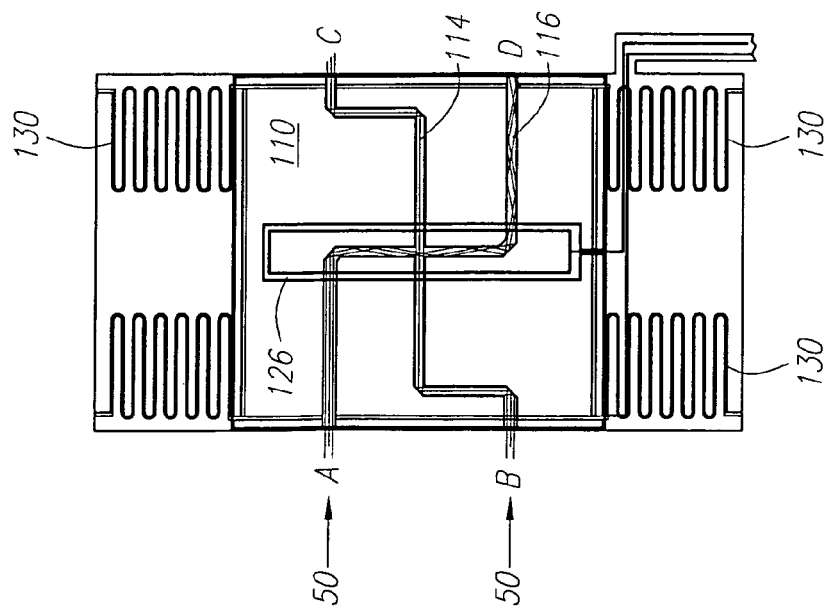
FIG. 7A illustrates an example embodiment of a switch element having a movable optically transmissive platform.

FIG. 7A illustrates an example embodiment of a small switch element 60 made by a micromachining process. This example embodiment is of a 2×2 switch element 60 because there are two inputs and two outputs; of course, the number of inputs and the number of outputs can be increased or decreased. The embodiment of the switch element 60 has two waveguides integrated on top of a carrier platform 110. The combined structure (waveguide and carrier) is bonded to a substrate 62 and positioned such that the switch element 60 is suspended over an air gap over, or a cavity 111 previously etched on, the substrate 62. The carrier platform 110 is preferably suspended approximately 30 microns above the actuation electrodes 112. The carrier platform 110 moves relative to the substrate. The waveguides 114, 116 are typically less than 10 microns and in this example, the small channel size is necessary to ensure transmission of only single-mode optical signals. The size of the structure and the design of the support springs 130 depend on the type of actuation mechanism used. The embodiment will use electrostatic attraction as the means of actuation.

For electrostatic actuation, both the carrier platform 110 and the stationary electrodes 112, 126 have to be electrically conductive, thereby causing the carrier 110 to move toward the electrodes 112, 126, as illustrated in FIGS. 7B and 7C. If the carrier platform 110 is made out of dielectric materials, it can be made conductive by coating the bottom (i.e., the surface facing the stationary actuation electrode 112) with a metal such as gold or nickel. If the carrier platform 110 is made of semiconductor materials such as silicon, it can be doped to increase electrical conductivity. Opposing and parallel to the carrier platform 110 are the stationary electrodes 112, 126 patterned on the bottom of the cavity 111. These electrodes 112, 126 connect to the top of the substrate 62 by traces patterned on the sloped surfaces. In the cavity 111, two stationary electrodes 112, 126 are made, one electrode 112 for actuating movement of the carrier platform 110 and the other electrode 126 for feedback sensing of the position of the carrier platform 110.

This example embodiment of the switch element 60 operates as follows. Optical signals 50 enter on the left of the switch element 60 at locations A and B. The optical signals 50 enter the waveguides 114, 116 and cross over due to the particular configuration of the waveguides in this embodiment. The optical signals 50 from locations A and B exit the switch element 60 at locations D and C respectively. The original optical signals 50 have crossed from A to D and from B to C. When no crossing of the optical signals 50 is desired in this particular embodiment, an electrical signal is required from the control hardware. By applying a voltage to the fixed electrodes 112 on the substrate 62 and a different voltage to the electrode of the carrier platform 110, the voltage difference will result in an electrostatic attraction force. Such a force will pull the carrier platform 110 (and the waveguides 114, 116 carried by the carrier platform 110) down (here, less than 10 micrometers) toward the fixed electrodes 112, 126 by bending the support springs 130, and therefore, in the process remove the waveguides 114, 116 from the optical path. The optical signals 50 from location A then pass directly (through free space 120) toward point C, and the optical signals 50 from location B pass directly (through free space 122) to location D. FIG. 7B illustrates the case where the carrier platform 110 is in its rest state because no power is applied to the actuation electrode 112; here, the optical signals 50 from locations A and B of the fixed waveguides at the input side of the carrier platform 110 cross over in movable waveguides 114, 116 to locations D and C, respectively, of the fixed waveguides at the output side of the carrier platform 110; waveguides 114, 116 are considered "movable" because they move with the movement of the carrier platform 110. The carrier platform 110 is also referred to as a movable microstructure. When power is applied to the actuation electrode 112, FIG. 7C illustrates the resulting configuration where the carrier platform 110 has moved toward actuation electrode 112; here, the optical signals 50 from locations A and B of the fixed waveguides at the input side of the carrier platform 110 pass directly through free space to locations C and D, respectively, of the fixed waveguides at the output side of the carrier platform 110 because movable waveguides 114, 116 have moved out of range of the optical signals 50.

Other methods of actuation are also viable. Electrostatic actuation is preferred because of the simplicity in design and operation. The main drawback is the higher voltage required to operate the resulting device, due to the large gap, typically ranging from 20 to 100 volts. Alternative actuation methods include magnetic and thermal techniques. These methods are well known to those skilled in the art of micromachine design.

The sensing electrode 126 on the substrate 62 is used to detect the position of the carrier platform 110 by sensing changes in capacitance between the electrode 126 and the electrode of the carrier platform 110 due to changes in the gap caused by movement of the carrier platform 110. Other means of sensing, such as piezo-resistive, magnetic, optical schemes are also viable. The signal from the sensing electrode 126 is used (through close-loop control) to accurately position the waveguides 114, 116 over the optical entrance and exit.

The primary loss of optical signal will be at the entrance of the movable waveguides 114, 116 (on the carrier platform 110 of the switch element 60) and at the entrance of the fixed waveguides. Reducing the distance between the locations A/C and between B/D can minimize such loss. To fully minimize loss, but with increased manufacturing complexity, a secondary waveguide 138, 140 can be designed on the bottom of the carrier platform 110. In that case, the opening between the stationary waveguides and the movable waveguides 114, 116 can be reduced to less than 2 microns, depending on the etching process. FIG. 7D illustrates a carrier platform 110 with waveguides 114, 116 on top and waveguides 138, 140 on the bottom, with one set designed for straight pass and the other for crossover. As is apparent from the embodiment shown in FIG. 7D, in the case where the carrier platform 110 is in its rest state because no power is applied to the actuation electrode 112, the optical signals 50 from locations A and B of the fixed waveguides at the input side of the carrier platform 110 pass through movable waveguides 138, 140 to the fixed waveguides at the output side of the carrier platform 110. Likewise, when power is applied to the actuation electrode 112, the carrier platform 110 moves toward actuation electrode 112 so the optical signals 50 from locations A and B of the fixed waveguides at the input side of the carrier platform 110 now pass through waveguides 114, 116 of the fixed waveguides at the output side of the carrier platform 110 because movable waveguides 138, 140 have moved out of range of the optical signals 50 and movable waveguides 114, 116 have moved into range of the optical signals 50. Of course, in an embodiment which uses double movable waveguides, such as that illustrated in FIG. 7D, the default can be either straight pass or crossover. In other words, waveguides 114, 116 can permit a straight pass while waveguides 138, 140 causes a cross over, or vice versa.

Figure 8A:
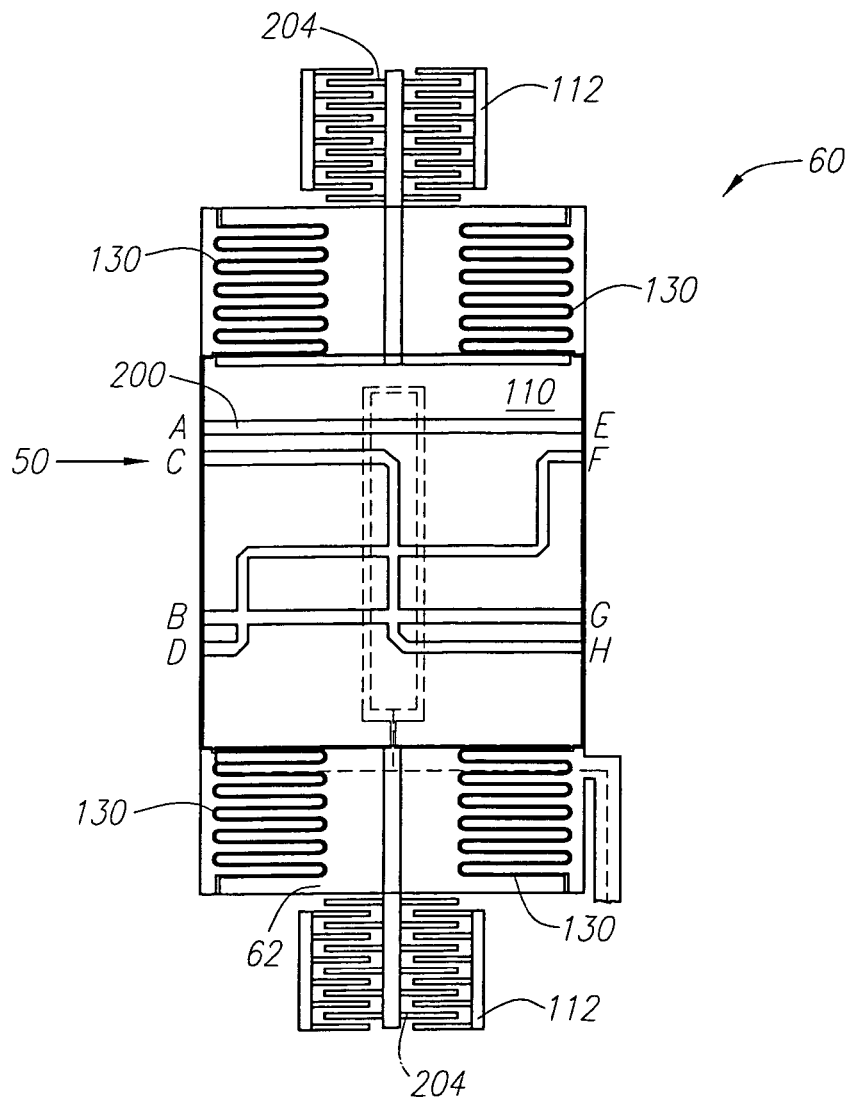
FIG. 8A illustrates an example alternative embodiment of a switch element having a movable optically transmissive platform which moves parallel to the plane of the substrate.
Figure 8B:
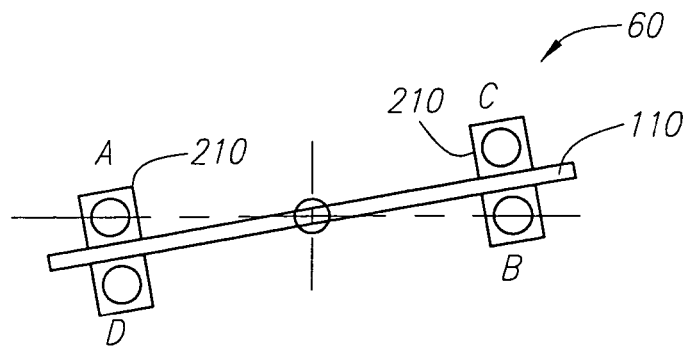
FIG. 8B illustrates an example alternative embodiment of a switch element having a rotatable or pivoting optically transmissive platform.
Figure 9:
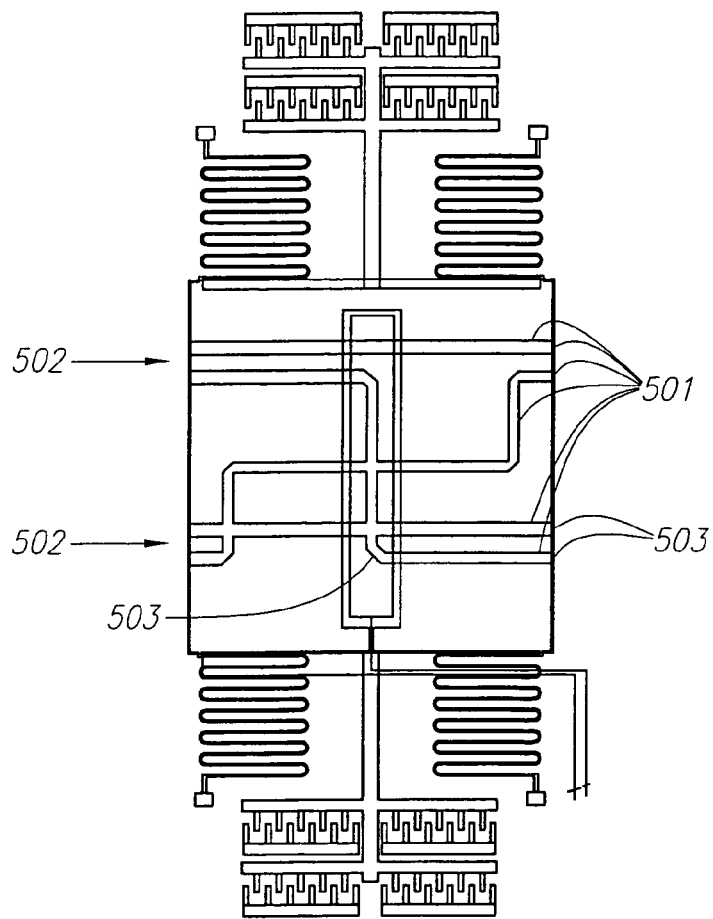
FIG. 9 illustrates a block diagram of a prior optical switch device as described in related and co-pending U.S. patent application Ser. Nos. 09/837,829 and 60/233,672.
Figure 10:
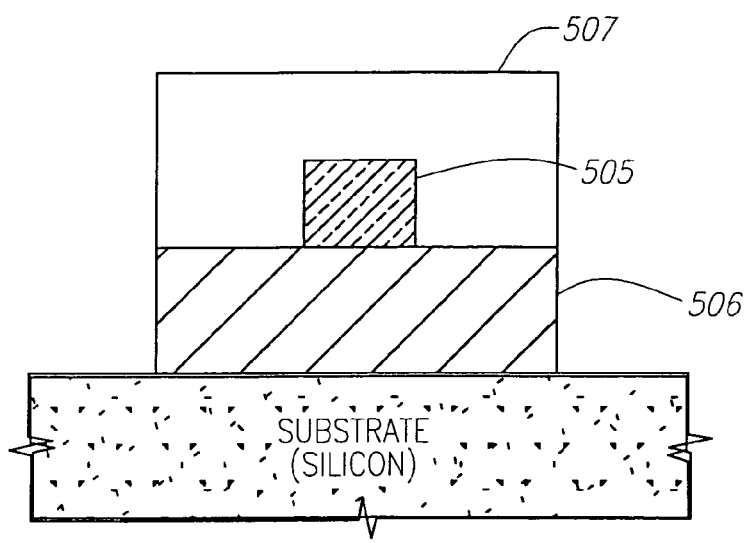
FIG. 10 illustrates a typical waveguide and its structures.

An alternative embodiment of a MEMS switch element 60 is now described. The movement of the switch element 60 is not limited to those in the vertical direction perpendicular to the substrate 62. FIG. 8A illustrates an example alternative embodiment of a MEMS switch element whereby the actuation direction is lateral or substantially parallel to the plane of substrate 62. FIG. 8B illustrates an example alternative embodiment of a MEMS switch element which relies on rotational movement. Of course, an optical switching system 10 may be created from optical switch elements which all move in the same manner (e.g., all move vertically, all move laterally, or all move rotationally) or optical switch elements which move in different manners (e.g., some move vertically and others move laterally, or some move vertically and others move rotationally, or some move laterally and others move rotationally). The lateral movement can be induced by applying different voltages to the inter-digitated (known as comb fingers in MEMS) structures as shown in FIG. 8A. Describing what is illustrated in FIG. 8A, the MEMS switch element 60 comprises a substrate 62. Suspended above substrate 62, for example over a cavity or otherwise, is a movable optically transmissive platform 110. Platform 110 is stated to be "optically transmissive" because it has structures (e.g., waveguide networks 200, 202) which transmits optical signals or light beams 50; it is not intended to mean that the entire platform itself must be optically transmissive. One side of the platform 110 is coupled to support springs 130 and the opposite ends of the support springs 130 are coupled or anchored to the substrate 62. The platform 110 has electrodes 204. In this example, electrodes 204 are inter-digitated with actuation electrodes 112. By applying different voltages to the electrodes 204 and actuation electrodes 112 on one side of the platform 110 as compared to the other side of the platform 110, the platform 110 moves in a lateral, or substantially parallel, manner relative to the plane of the substrate 62. In FIG. 8A, this lateral movement means that the platform 110 moves up or down.

The platform 110 carries waveguide networks 200, 202 where the optical paths from the input side of optical signals 50 to the output side change depending on the lateral position of the platform 110. For example, if the platform is in a first position (e.g., a rest position), the alignment of the incoming optical signals 50 to the inputs A, B, C and D of the waveguide networks 200, 202 is selected such that optical signals 50 enter inputs C and D. Because of the particular configuration of this example of the waveguide networks 200, 202, optical signals 50 which enter inputs C and D of the waveguide networks 200, 202 cross over and exit at outputs H and F respectively. If the platform 110 is then moved to its second position, incoming optical signals 50 would enter inputs A and B, and pass straight through to outputs E and G respectively. Of course, the waveguide networks 200, 202 can be swapped so that the default is a straight pass through. The waveguide networks may be configured in any shape or form to accomplish whatever optical paths are desired.

The lateral movement approach as shown in FIG. 8A has the advantage of not requiring the bottom electrodes, thus reducing several steps in the manufacturing process. The disadvantage is that the amount of electrode area is limited due to the short height of the resulting structure, and as a result, a large number of comb fingers may be required to generate a sufficient attraction force. A significantly larger electrode area may be required to operate the laterally-moving switch element of FIG. 8A than the vertically-moving switch element of FIG. 7A.

Turning to FIG. 8B, the movable optically transmissive platform 110 moves in a rotational or pivoting fashion relative to the substrate. To accomplish rotational movement in a switch element 60, the same electrostatic attraction forces as used in the preferred embodiments will work. For sensing the position of the platform 110, similar capacitance detection techniques described in the preferred embodiments will apply. As illustrated, this example embodiment of a rotating platform 110 causes inputs A and B to align with the optical signals when the platform 110 is in a first position. When the platform 110 rotates to its second position, inputs C and D are now aligned with the optical signals. As with all of the embodiments, the waveguides and waveguide networks may be configured in any desired shape to achieve the desired optical paths.

Now, we turn to FIGS. 11–15. The improvement to the optical switching device disclosed in this application shows several approaches to reducing the bend loss by using a large bend radius while maintaining the element size to a minimum. Several embodiments will be discussed. In addition to keeping the element size small, it is also desirable to keep the motion of the switch element to a single degree of freedom, i.e., motion along one direction only. A single degree of freedom motion greatly simplifies the design of the support and actuators.

Figure 11:
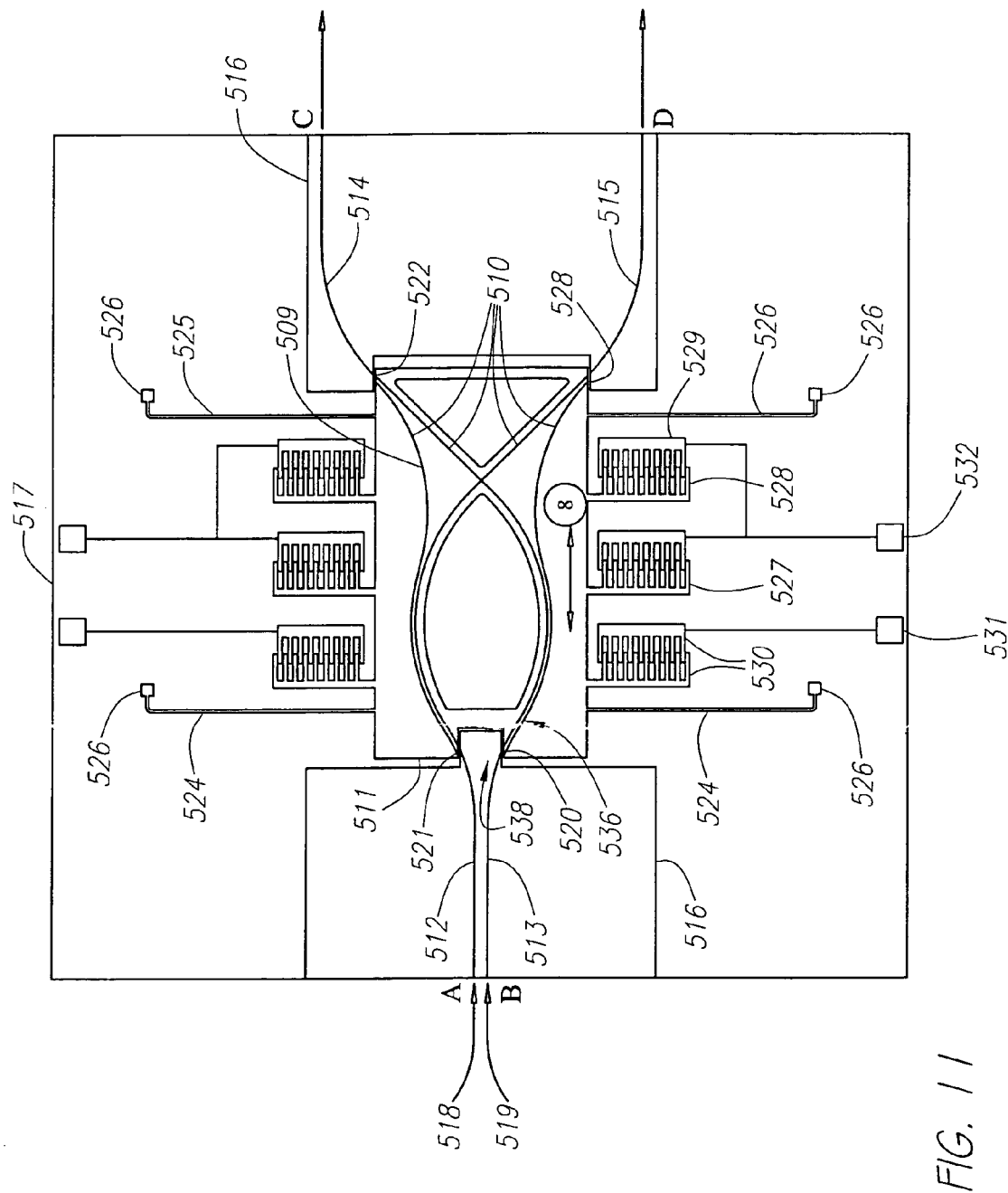
FIG. 11 illustrates a block diagram of an example embodiment of an improved optical switching device having a movable microstructure with low insertion loss.

FIG. 11 illustrates a block diagram of an example embodiment of an improved optical switching device having a movable microstructure with low insertion loss. The improved optical switching element is capable of switching two inputs 518, 519 to two outputs (such a switch is referred to as an 2×2 switch). The design allows a single degree-of-freedom motion (see 508) while maintaining a large bend radius 509. The improved optical switching device operates in two positions in this example embodiment. In position one, the two input optical signals are connected straight through input ports A, B to designated output ports C, D respectively; in position two, the input signals entering ports A, B cross over each other before being output at ports D, C respectively. In this example embodiment, all routings are done with waveguides 510 placed over the movable platform 511. Input waveguides 512, 513 and output waveguides 514, 515 are placed over raised platforms 516 that are stationary (fixed) to the substrate 517.

The improved optical switching device in FIG. 11 operates as follows. Optical signals are connected to the stationary waveguides by input ports A (518) and B (519). The movable microstructure 511 as shown in FIG. 11 is in the first position. In this first position, two optical signals traverse across separate gaps 520, 521 and enter into the movable microstructure 511. On the microstructure 511, the signals enter input ports A, B, cross over each other in waveguides 533, 534, and exit by traversing across a second set of gaps 522, 523 into the stationary waveguides 514, 515, and exit output ports D, C respectively. To allow the signals to go straight through (without cross over), the movable microstructure 511 is moved in the X direction to a second position. In the second position, waveguides 535, 536 are arranged such that the input optical signals will pass straight through from the input ports A, B to the output ports C, D respectively.

The movable microstructure of any embodiment can be made of silicon and other microstructure materials such as quartz, ceramic, metal and alloys. Preferably, the movable microstructure is manufactured onto the substrate by using a photo lithography process, depositing a material such as a semiconductor or dielectric or metal material, etching portions of material away, and repeating any of these semiconductor processing steps as needed. A semiconductor process or a micro-machining MEMS (Micro Electro Mechanical Systems) process, for example, may be used to create the movable microstructure to be integral with the substrate. The term "integral" as used in this patent application and claims refers to two structures that are coupled together by a semiconductor process. For example, if X is attached to Y by screws or bolts, X is not "integral" with Y. Further, the term "integral" does not require the two structures to be formed out of monolithic materials; two structures can be deemed integral to each other if the structures are formed out of composite or multiple materials, as well as if the structures are formed out of monolithic materials. For example, X can be integral with Y even if X is a platform coupled to a device layer which has been formed on a substrate by a semiconductor process. Lastly, X can be integral with Y even if X is silicon with a doped material and Y is silicon doped differently as long as the silicon are coupled together by a semiconductor process. The semiconductor process includes those which bond the movable microstructure to the substrate.

The movable microstructure 511 is suspended over an air gap above the substrate 517 and is supported by springs 524, 525. The springs 524, 525 are preferably made of the same material as the movable microstructure 511. The springs 524, 525 are connected to the substrate 517 through the anchors 526. The movable microstructure 511 is connected to a set of electrodes 527, 528 (illustrated as being shaped like combs) and matched to an opposing set of electrodes 529 fixed to the substrate 517. When an electrical voltage is applied across the two electrodes, the voltage differential generates an electrostatic attraction force, causing the movable microstructure 511 to move. The springs 524, 525 will deflect to move the movable microstructure 511 to the desired position. The use of electrostatic actuators to move a microstructure is well known to those skilled in the art of MEMS design. The waveguides 512–515 are deposited on top of the stationary platform 516 and the movable microstructure 511 using standard waveguide manufacturing processes.

To enable the waveguides to efficiently conduct light across the gaps, the waveguides 533–536 on the movable microstructure 511 must be aligned accurately to the fixed waveguides 512–515. This can be accomplished in two ways: by having mechanical stops or by electronics position control. Mechanical stops can be placed adjacent to the movable microstructure 511 and located at the desired distance from the movable microstructure 511. If there are only two positions, two stops would be required. The achievable alignment accuracy is dependent on the accuracy of the etching process.

In FIG. 11, a set of electrodes 530 are used for sensing the position of the movable microstructure 511. The sensing electrodes 530, similar to the actuator electrodes 527, 528 are preferably arranged using the comb-like structures. As the movable microstructure 511 moves, the capacitance across the comb-like electrodes 530 changes, which can be measured using appropriate detection circuits. The movable microstructure 511 can be positioned accurately based on the measured capacitance signal. For high reliability, the signals from the sensing circuit can also be fed into a closed-loop control circuit such that the movable microstructure 511 can be driven accurately into the desired position. The electrodes 530, 527, 528 are routed to the edge of the substrate 517 for connection to wire bond pads 531, 532. The sensing circuits and detailed electronic designs are well known to those skilled in design of MEMS structures.

As can be seen in FIG. 11, the waveguides 533–536 on the movable microstructure 511 have a large bend radius (see, e.g., 509, 537). This large bend radius 509 gradually changes the direction of the optical signal contained within the waveguide, thereby reducing the insertion loss. Preferably, the waveguides 533–536 on the movable microstructure 511 are made up of one or more short waveguide portions, each of which having a large bend radius to gradually change the direction of the optical signal. The movable microstructure 511 in FIG. 11 extends in the X and Y directions. The X and Y axes are illustrated in FIG. 11 for convenience. In the example embodiment of FIG. 11, the movable microstructure 511 moves in the X direction (also denoted by reference numeral 508).

In FIG. 11, a notch 538 in the movable microstructure 511 improves the ability of the waveguides 533–536 to gradually change the optical path of the optical signal. The notch 538 and its operation are now described for the example embodiment illustrated in FIG. 11. The notch 538 is in the edge of movable microstructure 511 which is substantially along the Y axis. The notch 538 has an edge 539 which is substantially parallel to the Y axis and an edge 540 which is substantially parallel to the X axis. When the movable microstructure 511 is in the first position, stationary waveguides 512, 513 are aligned with movable waveguides 533 and 534, respectively, where stationary waveguides 512, 513 meet (via small air gaps 521, 520) movable waveguides 533 and 534, respectively, at the edge 540 of the notch 538. The optical signals cross over in movable waveguides 533 and 534 and exit the movable waveguides 533 and 534 at an edge substantially parallel to the X axis of the movable microstructure 511, where the optical signals enter stationary waveguides 515, 514, respectively. When the movable microstructure 511 is moved to the second position, stationary waveguides 512, 513 are aligned with movable waveguides 535 and 536, respectively, where stationary waveguides 512, 513 now meet movable waveguides 535 and 536, respectively, (via small air gaps 521, 520) at the edge 540 of the notch 538. The optical signals pass through (with no crossover) in movable waveguides 535 and 536 and exit the movable waveguides 535 and 536 at an edge substantially parallel to the X axis of the movable microstructure 511, where the optical signals enter stationary waveguides 514, 515, respectively. The presence of the notch 538 allows the improved optical switching device to change the direction of the optical signal even more gradually. As a result, the edge 540 of the notch 538 (into which the optical signal enters) is substantially parallel in FIG. 11 to the edge of the movable microstructure 511 out of which the optical signal exits. Of course, the shapes and sizes of the perimeter of the notch 538 and of the edges of the movable microstructure 511 may be changed to other suitable shapes and sizes.

Figure 12:
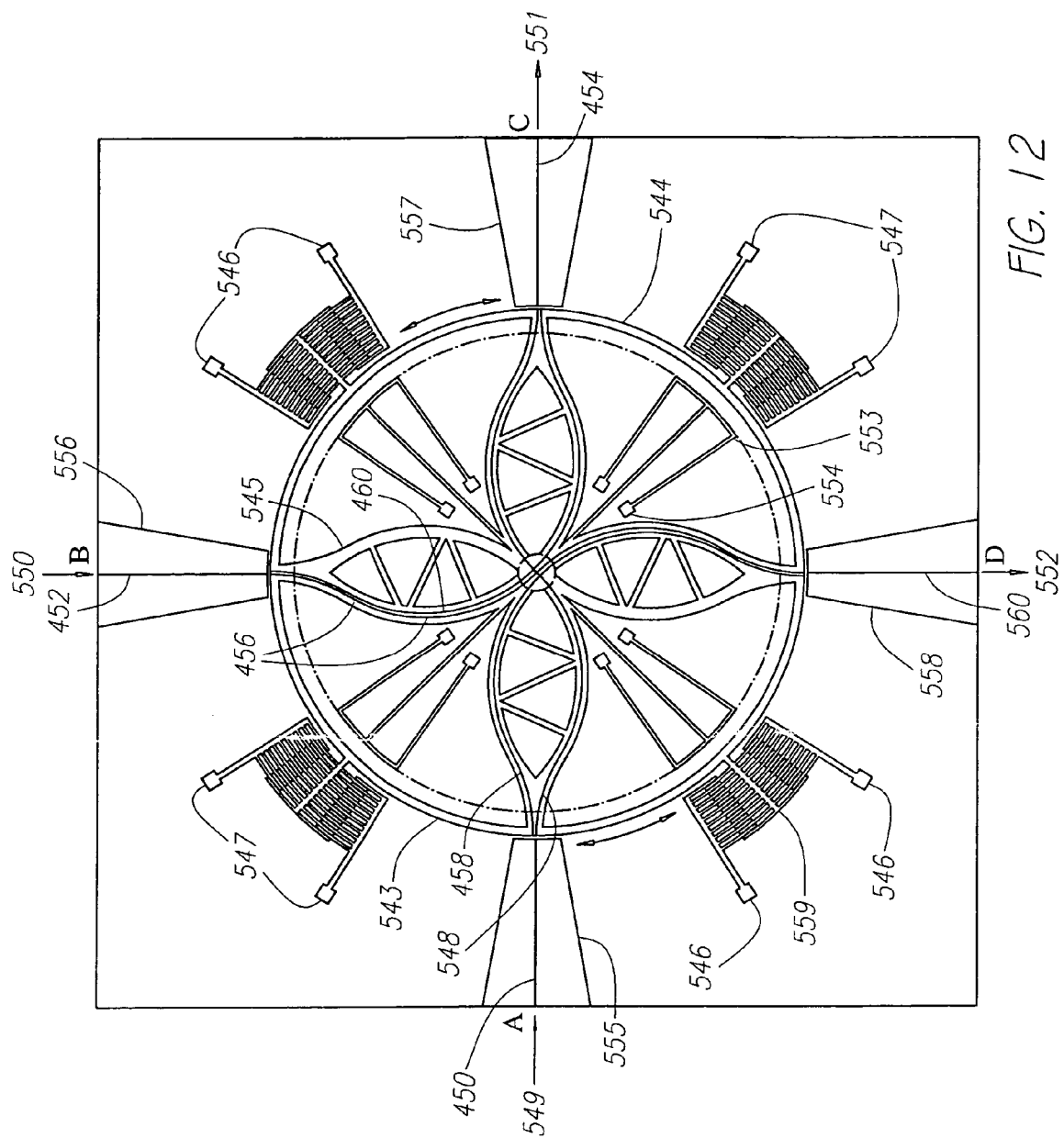
FIG. 12 illustrates a block diagram of another example embodiment of an improved optical switching device having a rotatable microstructure with low insertion loss.

FIG. 12 illustrates a block diagram of another example embodiment of a low loss improved optical switching device where the movable microstructure 543 is a rotatable microstructure. For convenience, the terms "movable microstructure" and "movable platform" also refer to any moving microstructure, including those which rotate and those which move linearly. In this configuration, the motion of the movable microstructure 543 still has a single-degree of freedom, but the single-degree of freedom 544 is angular rather than linear. The movable or rotatable microstructure 543, in this particular example embodiment, is in the shape of a ring. There are four leaf-like waveguide structures 545 inside the ring. Preferably, the leaf-like waveguide structures have large radii of curvature so that the waveguides change the direction of the optical signal gradually. Outside the ring are the electrodes used for actuation 546 and sensing 547. The movable waveguides 548 are located on top of the movable microstructure 543, with connection points located at four locations (549, 550, 551, 552). The ring structure is connected to the springs 553, and the entire movable microstructure 543 is suspended over an air gap above the substrate. The springs 553 are connected to the substrate through the anchors 554. Input and output signals are connected to the movable microstructure 543 through stationary waveguides 450, 452, 454 and 560. The stationary waveguides 450, 452, 454 and 560 are preferably located on four raised platforms 555, 556, 557, 558, respectively, so that the waveguides are all at the same height.

The optical switching device of FIG. 12 operates as follows. Incoming optical signals are connected to the top and left side of the switch. As shown in FIG. 12, when the movable microstructure 543 is in the first position, the stationary waveguide 450 at input ports A (549) is coupled (preferably via a small air gap) to movable waveguide 548 in order to route a first optical signal to stationary waveguide 454 at output port C (551). Similarly, the stationary waveguide 452 at input port B (550) is coupled (preferably via a small air gap) to movable waveguide 456 in order to route a second optical signal to cross over the first optical signal, where the second optical signal passes through stationary waveguide 560 and exits output port D (552). In all embodiments, the waveguides are preferably coupled to one another by small air gaps. Smaller air gaps permit better alignment between waveguides.

When the movable microstructure 543 is moved to the second position, the stationary waveguide 450 at input ports A (549) is now coupled (preferably via a small air gap) to movable waveguide 458 in order to route the first optical signal to stationary waveguide 560 at output port D (552). Similarly, in the second position, the stationary waveguide 452 at input port B (550) is coupled (preferably via a small air gap) to movable waveguide 460 in order to route a second optical signal to cross over the first optical signal, where the second optical signal passes through stationary waveguide 454 and exits output port C (551). Thus, when the movable microstructure 543 is in the first position, an optical signal from input port A (549) will exit output port C (551) and an optical signal from input port B (550) will exit output port D (552). By contrast, when the movable microstructure 543 is in the second position, an optical signal from input port A (549) will exit output port D (552) and an optical signal from input port B (550) will exit output port C (551).

To rotate the movable microstructure 543 between the first and second positions, a differential voltage is applied to the drive electrode 546, which is fixed to the substrate, and the movable electrode 559 attached to the ring. An attractive force is generated between the fixed electrode 546 and the moveable electrode 559 as a result of the voltage differential, which rotates the ring in a clockwise direction. To maximize the coupling of light between the stationary and movable waveguides, the angular position of the ring should be precisely controlled. This control can be achieved by monitoring the change in capacitance from the sensing electrodes 547. An electrical circuit that converts the change in capacitance to voltage will be required and is commercially available. Alternatively, mechanical stops could also be used to position the ring structure accurately. The design of comb electrodes and associated sensing circuits are well known to those skilled in the art of MEMS design.

As with the example embodiment illustrated in FIG. 11, the example embodiment of FIG. 12 also gradually changes the direction of optical signals, thereby reducing insertion losses. Large bend radii are also used. Of course, the shapes and sizes of the ring, waveguides and edges of the movable microstructure 511 may be changed to other suitable shapes and sizes.

Figure 13:
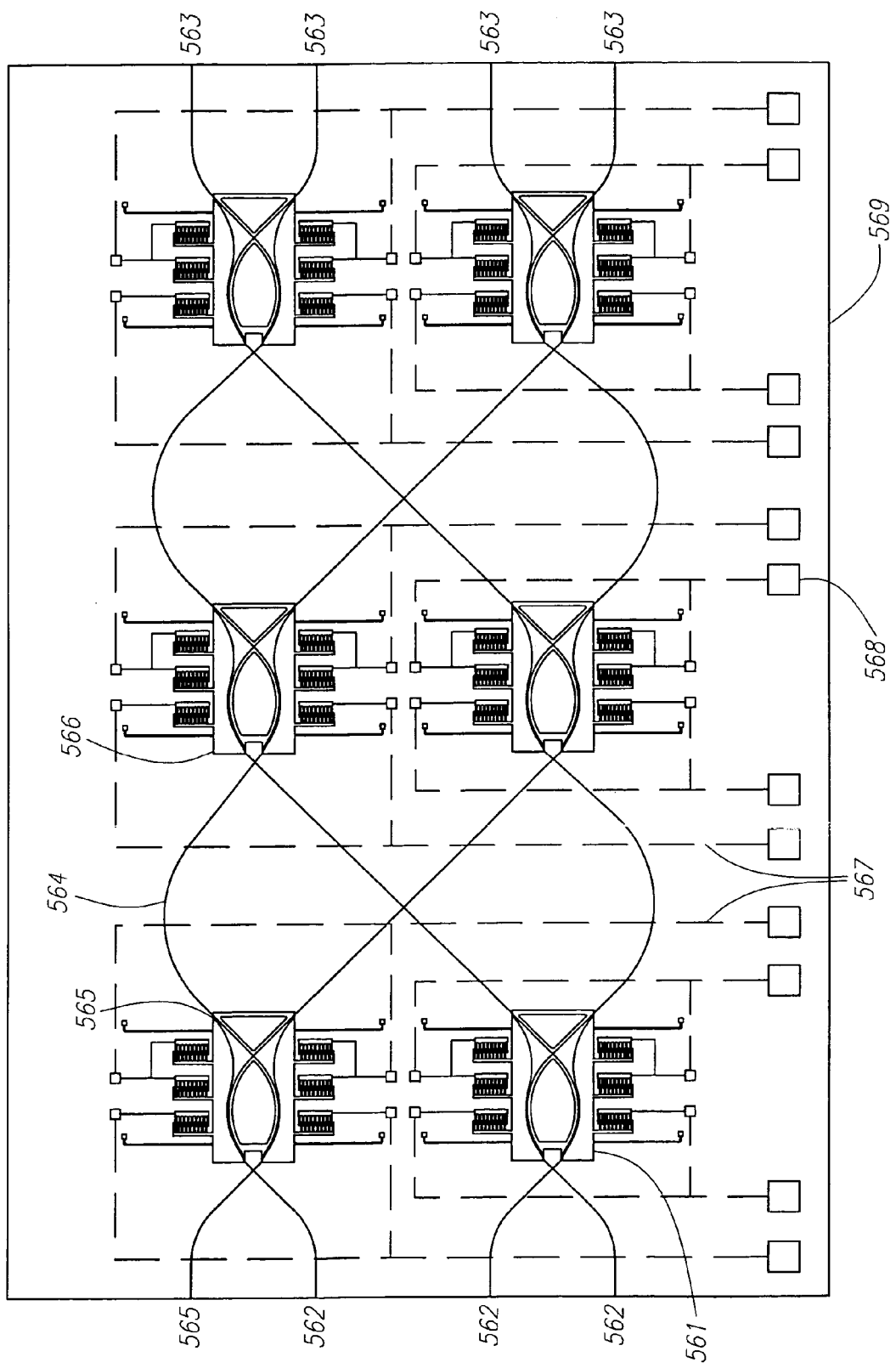
FIG. 13 illustrates a block diagram of an example embodiment of a system of improved optical switching devices with movable microstructures and low insertion losses.

The optical switching devices discussed above represent a basic building block that can be used to build larger-port switches. Each optical switching device is capable of switching two ports so an array of these optical switching devices can be combined to switch 4, 8, 16, 32, or more ports. Based on the optical switching devices of FIG. 11, FIG. 13 shows an array of six optical switching devices 561 on a substrate 569, forming a single switch capable of connecting four input ports (562) to any of the four output ports (563). Electrical traces 567 connect the optical switching devices' actuator and sensor to the wire bond pads 568 located on edge of the substrate 569.

There are a number of different architectures that use the basic 2 by 2 or 1 by 2 switches to form larger switches. The example shown in FIG. 13 is based on a Benes architecture. Other popular architectures include crossbar, Spanke and Clos networks. These multi-stage networks are well known to those skilled in the art of network switch designs. The design of the network and the routing paths should also be carefully conducted to minimize optical loss. In FIG. 13, for example, the largest possible radius should be used for the waveguides 564 between adjacent optical switch devices 565, 566 in order to minimize loss.

Of course, the optical switching devices with rotatable microstructures of FIG. 12 can also be used to create an array of multiple optical switching devices, forming a single switch capable of connecting four input ports to any of the four output ports.

1×2 and 1×N Linear Switches

Figure 14A:
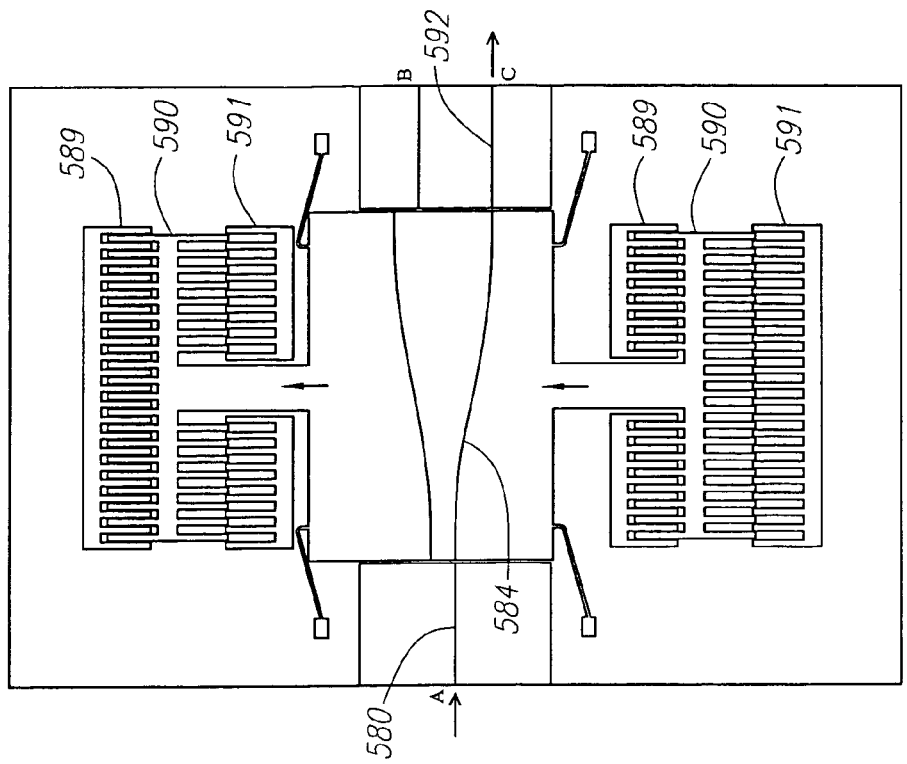
FIG. 14A illustrates a block diagram of an example embodiment of an improved 1×2 optical switching device with a movable microstructure and low insertion losses, where the movable microstructure is in a first position.
Figure 14B:
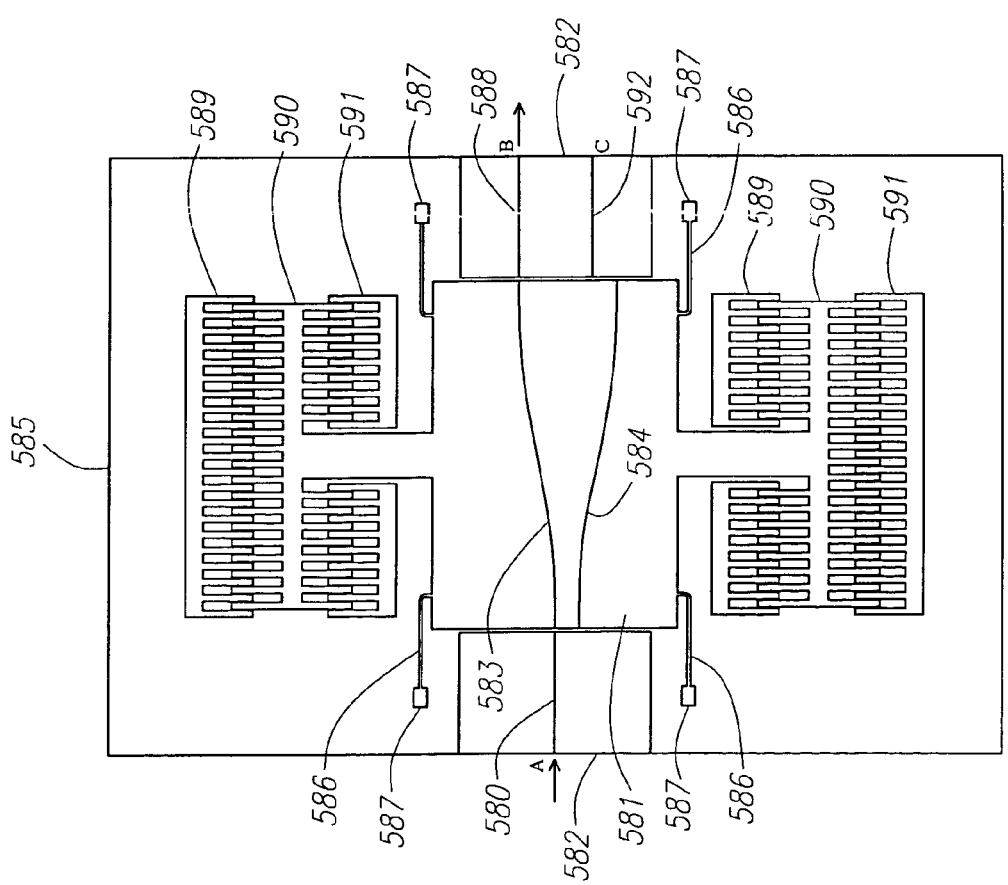
FIG. 14B illustrates a block diagram of an example embodiment of an improved 1×2 optical switching device with a movable microstructure and low insertion losses, where the movable microstructure is in a second position.

The techniques described herein have been illustrated for the example of switching two optical inputs to two outputs. The same concept may be adapted for switching n optical signals to m output ports. For example, FIGS. 14A and 14B illustrate a concept of a 1×2 optical switching device employing linear movement. The 1×2 optical switching device receives one optical signal and directs the signal to one of two output ports. An optical signal is transmitted into an input port A and into a stationary waveguide 580. The optical signal propagates into another waveguide 583 located on top of a movable microstructure 581. The stationary waveguide 580 is located on a raised pedestal or platform 582 so that the waveguide 580 is at the same height level as the waveguides 583, 584 on the movable microstructure 581. The movable microstructure 581 is suspended above an air gap over the substrate 585 and supported by springs 586. The springs 586 are in turn connected to the substrate 585 by anchors 587. As shown in FIG. 14A, the optical signal will travel from the input waveguide 580, through the movable waveguide 583, into stationary output waveguide 588, and exit output port B.

To switch the optical signal to exit from another output port C, a voltage is applied to the electrodes 589, 590 as shown in FIG. 14B. The resulting electrostatic attraction will force the movable microstructure 581 to change its position. In this new position, the stationary waveguide 580 is coupled to the second movable waveguide 584, as well as to the stationary output waveguide 592. In doing so, the signal is diverted into the second waveguide 584 and exits output port C. In order to set the position of the movable waveguides 583, 584 precisely, electrode 591 can be used for capacitance sensing. The design of the comb actuators and sensors are similar to the details discussed above.

The same technique can be expanded into a 1×N type of switch where N can be two or any number of ports. This type of switch is useful for connecting an optical input to a multiple number of outputs. The switch can also be used in reverse to connect a plurality of inputs into one output. The following reference illustrates an application for using 1×8 switch in a Broadcast and Select architecture: Jean-Paul Faure, Ludovic Noire, "An 8×8 all optical space switch based on a novel 8×1 MOEMS switching module", OFC2001, Section WX5-2, Anaheim, Calif., Mar. 21, 2001.

1×2 and 1×N Rotary Switches

Figure 15:
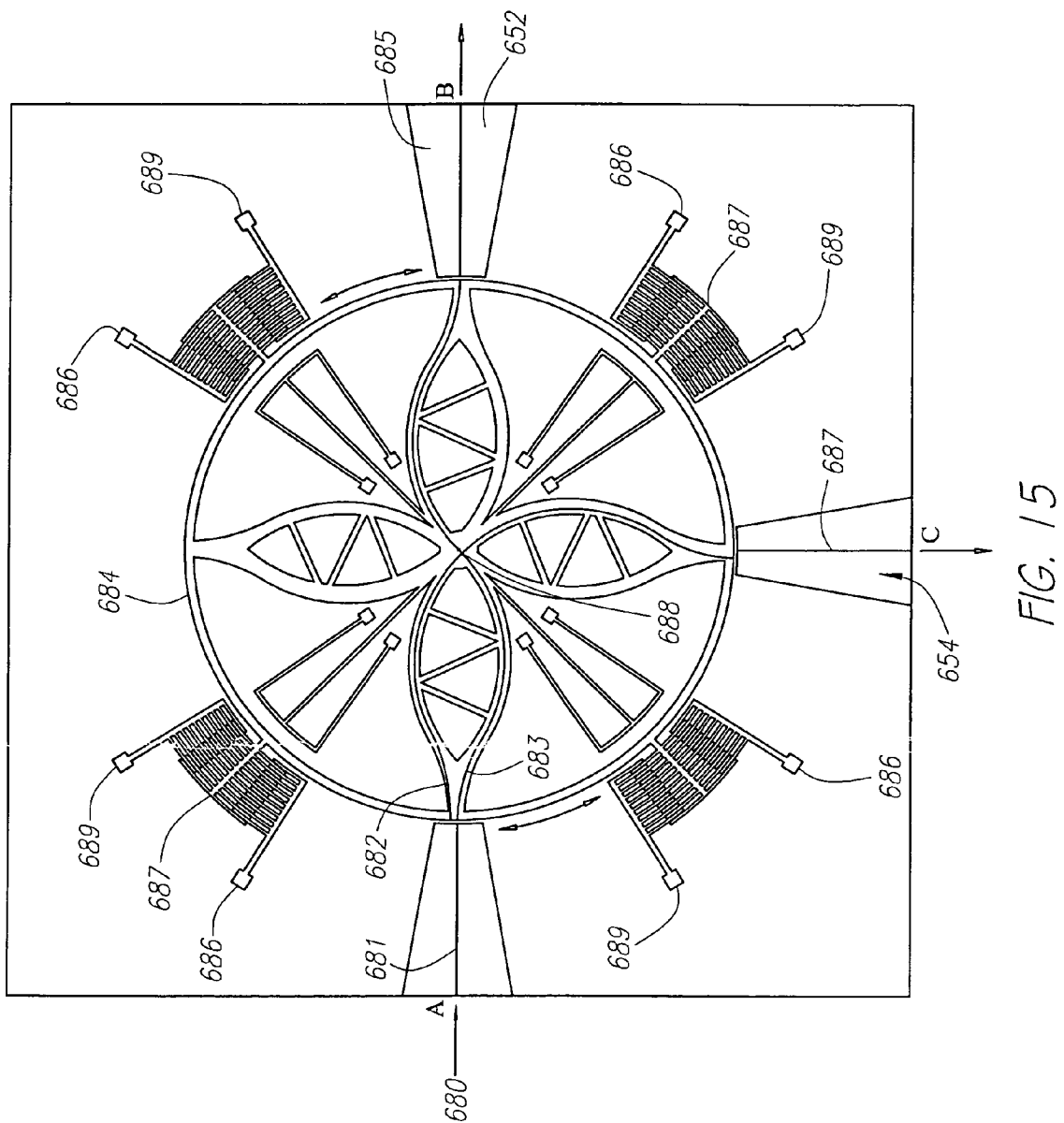
FIG. 15 illustrates a block diagram of yet another example embodiment of an improved 1×2 optical switch device with a rotatable microstructure and low insertion losses.

FIG. 15 illustrates another example embodiment of a 1×2 optical switching device, whereby the switching action is rotational rather than linear. The operation of the 1×2 optical switching device is similar to the 2×2 optical switching devices described herein. In FIG. 15, only one stationary input waveguide 681 is used to guide an optical signal into the movable waveguides 682 or 683. Depending on the position of the movable microstructure 684, the optical signal can be switched to any of the two outputs B or C.

The operation is as follows. An optical signal 680 enters input port A, travels in stationary input waveguide 681 which is positioned on a raised platform 650, and propagates to one of waveguides 682 or 683 located on the movable microstructure 684 (preferably via a small air gap between waveguide 681 and waveguide 682 or 683). In the position as shown in FIG. 15, the optical signal enters into waveguide 683, propagates into a stationary output waveguide 685 (preferably over a small air gap) which is located on a raised platform 652, and exits the output port B. If a voltage differential is applied to the fixed electrode 686 and movable electrode 687, then waveguide 682 is moved into alignment with the input waveguide 681. In this mode, the optical signal propagates into waveguide 682, stationary output waveguide 687 which is located on a raised platform 654, and output port C. The raised platforms 650, 652 and 654 are optional and serve to align the stationary waveguides 681, 685 and 687 to be at the same height as the movable waveguides 682, 683.

A cross-over 688 is shown between waveguides 682 and 683. To minimize the optical loss associated with a cross-over, the waveguides 682 and 683 are preferably located at about 90 degrees relative to each other. Electrodes 689 can be used to determine the position of the movable microstructure 684 by connecting the electrodes to a detection circuit. The method of actuation and position sensing are similar to the details of those discussed herein. The rotational 1×2 optical switch as described can also be reconfigured to a 1×N port optical switch, where N is a number larger than two.

While various embodiments of the application have been described, it will be apparent to those of ordinary skill in the art that many more embodiments and implementations are possible that are within the scope of the subject invention. For example, each feature of one embodiment can be mixed and matched with other features shown in other embodiments. Features known to those of ordinary skill in the art of optics may similarly be incorporated as desired. Additionally and obviously, features may be added or subtracted as desired and thus, a movable platform having more than two sets of optical paths is also contemplated, whereby the platform moves to any one of three or more positions such that each position activates a different set of optical paths. As another example, the optical switch may accept more than 2 inputs and provide more than 2 outputs. The optical switch may be combined so as to create bigger optical switches with more ports, as desired. Accordingly, the invention is not to be restricted except in light of the attached claims and their equivalents.

What is claimed is:

1. An apparatus for switching an optical signal, the apparatus comprising:
   a substrate;
   a movable microstructure formed by a semiconductor process on the substrate, the movable microstructure being suspended at a distance from the substrate and being adapted to move relative to the substrate;
   an actuator to cause the movable microstructure to move from a first position to a second position relative to the substrate;
   a mirrorless light-guiding structure mounted to the movable microstructure such that the mirrorless light-guiding structure moves with the movable microstructure, the mirrorless light-guiding structure including a first set of optical paths and a second set of optical paths such that when the movable microstructure is in the first position, the optical signal travels along the first set of optical paths in the light-guiding structure, and when the movable microstructure is in the second position, the optical signal travels along the second set of optical paths in the mirrorless light-guiding structure;
   an input stationary waveguide coupled to the substrate and positioned to transmit the optical signal over a gap between the input stationary waveguide and the first set of optical paths in the mirrorless light-guiding structure, wherein the gap is oriented at an obligue angle to the input stationary waveguide and to the first set of optical paths of the mirrorless light-guiding structure; and
   a notch in a first edge portion of the movable microstructure, the first edge portion extending in a Y direction, the microstructure having a second edge portion which extends in an X direction, the X and Y directions being substantially perpendicular to each other, the notch having a third edge portion and a fourth edge portion, wherein the fourth edge portion extends substantially parallel to the X direction, and wherein the optical signal enters the first set of optical paths at the fourth edge portion of the notch, wherein the gap is located adjacent to the fourth edge portion of the notch.

2. The apparatus of claim 1 wherein the optical signal exits the first set of optical paths at the second edge portion of the movable microstructure.

3. The apparatus of claim 1, wherein the movable microstructure is adapted to move in the X direction relative to the substrate.

4. An optical switching system comprising:
   (a) an input port comprising a stationary input light guiding structure adapted to receive a first optical signal, the stationary input light guiding structure being aligned to transmit the first optical signal to one of a plurality of optical switching devices;
   (b) a plurality of output ports; and
   (c) the plurality of optical switching devices coupled to the input port and adapted to receive the first optical signal from the stationary input light guiding structure and switch the first optical signal to one of the plurality of output ports, each optical switching device comprising:
      (i) a substrate;
      (ii) a movable microstructure formed by a semiconductor process on the substrate, the movable microstructure being suspended at a distance from the substrate and being adapted to move relative to the substrate;
      (iii) an actuator adapted to cause the movable microstructure to move from a first position to a second position relative to the substrate;
      (iv) a light-guiding structure mounted to the movable microstructure such that the light-guiding structure moves with the movable microstructure, wherein the light-guiding structure comprises a first set of optical oaths and a second set of optical paths, such that when the movable microstructure is in a first position, the first optical signal travels alone the first set of optical oaths in the light-guiding structure, and when the movable microstructure is in a second position, the first optical signal travels along the second set of optical paths in the light-guiding structure;
      (v) a gap formed between and defined by a first face of the stationary input light guiding structure and a second face of the first set of optical paths of the movable microstructure, wherein the gap causes the first optical signal to exit the stationary input light guiding structure at an oblique angle and to enter the first set of optical paths at an oblique angle; and
      (vi) a notch in a first edge portion of the movable microstructure, the first edge portion extending in a Y direction, the microstructure having a second edge portion which extends in an X direction, the X and Y directions being substantially perpendicular to each other, the notch having a third edge portion and a fourth edge portion, wherein the fourth edge portion extends substantially parallel to the X direction, and wherein the first optical signal enters the first set of optical paths at the fourth edge portion of the notch, wherein the gap is located adjacent to the fourth edge portion of the notch.

5. The optical switching system of claim 4, wherein the first optical signal exits the first set of optical paths at the second edge portion of the movable microstructure.

* * * * *